US010880762B2

(12) United States Patent
Hosseini et al.

(10) Patent No.: US 10,880,762 B2
(45) Date of Patent: Dec. 29, 2020

(54) LINK QUALITY MONITORING, SIGNALING AND PROCEDURES FOR SPECIFIC SERVICE TYPE

(71) Applicant: QUALCOMM incorporated, San Diego, CA (US)

(72) Inventors: Seyedkianoush Hosseini, San Diego, CA (US); Amir Farajidana, Sunnyvale, CA (US); Umesh Phuyal, San Diego, CA (US); Farnaz Karimdady Sharifabad, Fremont, CA (US); Tae Min Kim, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/417,137

(22) Filed: May 20, 2019

(65) Prior Publication Data

US 2019/0357064 A1 Nov. 21, 2019

Related U.S. Application Data

(60) Provisional application No. 62/674,538, filed on May 21, 2018.

(51) Int. Cl.
*H04W 24/04* (2009.01)
*H04W 24/08* (2009.01)
(Continued)

(52) U.S. Cl.
CPC ........... *H04W 24/04* (2013.01); *H04W 24/08* (2013.01); *H04W 36/165* (2013.01); *H04W 72/042* (2013.01); *H04W 72/12* (2013.01)

(58) Field of Classification Search
None
See application file for complete search history.

(56) References Cited

U.S. PATENT DOCUMENTS

2012/0213107 A1* 8/2012 Jang .................... H04W 72/087
370/252
2012/0281548 A1 11/2012 Lin et al.
(Continued)

FOREIGN PATENT DOCUMENTS

GB         2507570 A       5/2014
WO     WO-2018082521 A1    5/2018

OTHER PUBLICATIONS

International Search Report and Written Opinion—PCT/US2019/033228—ISA/EPO—dated Jul. 17, 2019.

*Primary Examiner* — Chi H Pham
*Assistant Examiner* — Vladislav Y Agureyev
(74) *Attorney, Agent, or Firm* — Holland & Hart LLP/Qualcomm

(57) ABSTRACT

Methods, systems, and devices for wireless communications are described. A user equipment (UE) may identify first set of metrics associated with a radio link monitoring procedure on a radio link and identify a second set metrics associated with a procedure for monitoring whether communications of a first service type or having a first quality of service requirement are supportable. The UE may monitor the radio link based on the first set of metrics to assess for radio link failure and monitor at least a portion of the radio link based on the second set of metrics. The UE may determine that a component of the radio link fails to satisfy the second set of metrics, and the UE may transmit an indication of the determination to the base station. The UE and the base station may update the radio link without declaring radio link failure.

30 Claims, 16 Drawing Sheets

(51) Int. Cl.
*H04W 36/16* (2009.01)
*H04W 72/04* (2009.01)
*H04W 72/12* (2009.01)

(56) References Cited

U.S. PATENT DOCUMENTS

| | | |
|---|---|---|
| 2013/0003533 A1 | 1/2013 | Barbieri et al. |
| 2014/0112155 A1 | 4/2014 | Lindoff et al. |
| 2016/0065433 A1* | 3/2016 | Hui .................... H04L 43/0811 709/224 |
| 2016/0095034 A1* | 3/2016 | Hampel ................ H04W 36/14 370/331 |
| 2017/0048736 A1 | 2/2017 | Marinier et al. |
| 2018/0007574 A1 | 1/2018 | Park et al. |
| 2019/0053293 A1* | 2/2019 | Akoum ................. H04W 76/19 |
| 2019/0182884 A1* | 6/2019 | Deenoo ............... H04W 68/005 |
| 2019/0246420 A1* | 8/2019 | Park .................... H04W 72/087 |
| 2019/0254042 A1* | 8/2019 | Cirik ................... H04W 56/001 |
| 2019/0364492 A1* | 11/2019 | Azizi ................. H04W 68/005 |
| 2020/0059404 A1* | 2/2020 | Liu ...................... H04W 76/27 |

\* cited by examiner

LINK QUALITY MONITORING, SIGNALING AND PROCEDURES FOR SPECIFIC SERVICE TYPE

CROSS REFERENCES

The present application for patent claims the benefit of U.S. Provisional Patent Application No. 62/674,538 by HOSSEINI, et al., entitled "LINK QUALITY MONITORING, SIGNALING AND PROCEDURES FOR SPECIFIC SERVICE TYPE," filed May 21, 2018, assigned to the assignee hereof, and expressly incorporated by reference herein.

BACKGROUND

The following relates generally to wireless communications, and more specifically to link quality monitoring, signaling and procedures for a specific service type.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station and a UE may establish a radio link including multiple types of communications services, with each type of communications service having different reliability requirements. The UE may perform radio link monitoring (RLM) to detect radio link failure (RLF). If the UE bases its determination of RLF on stringent requirements associated with a communications service, then the UE may declare RLF frequently, thus interrupting communications that are not associated with the stringent requirements. If, on the other hand, the UE bases its determination of RLF on relaxed requirements associated with a communication service having less stringent requirements, the UE may avoid declaring RLF or making other adjustments when the communications associated with stringent requirements cannot be supported by the link. In other words, if the UE determines that the radio link is out of synch or unable to support a reliability requirement, the UE may indicate RLF, but if the UE only uses a single set of criterion to determine RLF, communications on some or all communications services may be unduly interrupted. If the radio link is determined to have failed, the UE and the base station may re-establish the radio link, which may prevent transmission using any of the communications services provided with the radio link. This may reduce throughput and increase latency, as the UE may have to wait until the radio link is re-established to communicate with the base station.

SUMMARY

A user equipment (UE) and a base station may establish a radio link providing multiple types of wireless communications services. For example, the radio link may include carriers for low latency communications and legacy communications. The UE may monitor the radio link for radio link failure (RLF). The UE may receive reference signals transmitted by the base station on each carrier of the radio link. Based on the signal strength of the reference signals and a set of metrics associated with the radio link, the UE may determine if the downlink transmissions are decodable with an acceptable error rate. The UE may detect whether the radio link has experienced RLF based on a number of consecutive successful or unsuccessful decodings and the set of metrics associated with the radio link, and the UE may report to the base station if RLF has occurred. The UE and base station may implement techniques to inform the base station that a type of service or a quality of service (QoS) level for a type of service is not supportable. The UE may receive a configuration including a second set of metrics associated with a communication service, where the second set of metrics is different from a first set of metrics associated with legacy communications or communications associated with a less stringent requirement. Based on the second set of metrics, the UE may determine whether certain reliability requirements can be met by one or more of the carriers and whether a type of service or QoS level for the type of service can be supported by the radio link. The UE may transmit an indication to the base station that a type of service or a QoS level for the type of service cannot be supported, and the base station and the UE may update the radio link without declaring RLF and dismantling the radio link.

A method of wireless communication is described. The method may include identifying one or more first metrics associated with a radio link monitoring (RLM) procedure on a radio link including one or more component carriers, identifying one or more second metrics associated with a procedure for monitoring whether communications of a first service type or having a first quality of service requirement are supportable, monitoring the radio link, based on the one or more first metrics, to assess for radio link failure, monitoring at least a portion of the radio link, based on the one or more second metrics, to assess the portion of the radio link for communications of the first service type or having the first quality of service requirement separate from the assessment for radio link failure, determining that at least a component carrier of the radio link fails to satisfy the one or more second metrics, where the component carrier is included in the portion of the radio link monitored based at least on the one or more second metrics, and updating the radio link based on the determination without declaring radio link failure.

An apparatus for wireless communication is described. The apparatus may include a processor, memory coupled with the processor, and instructions stored in the memory. The instructions may be executable by the processor to cause the apparatus to identify one or more first metrics associated with an RLM procedure on a radio link including one or more component carriers, identify one or more second metrics associated with a procedure for monitoring whether communications of a first service type or having a first quality of service requirement are supportable, monitor the radio link, based on the one or more first metrics, to assess for radio link failure, monitor at least a portion of the radio link, based on the one or more second metrics, to assess the portion of the radio link for communications of the first service type or having the first quality of service requirement separate from the assessment for radio link failure, determine that at least a component carrier of the radio link fails to satisfy the one or more second metrics, where the component carrier is included in the portion of the radio link monitored based at least on the one or more second metrics, and update the radio link based on the determination without declaring radio link failure.

Another apparatus for wireless communication is described. The apparatus may include means for identifying one or more first metrics associated with an RLM procedure on a radio link including one or more component carriers, identifying one or more second metrics associated with a procedure for monitoring whether communications of a first service type or having a first quality of service requirement are supportable, monitoring the radio link, based on the one or more first metrics, to assess for radio link failure, monitoring at least a portion of the radio link, based on the one or more second metrics, to assess the portion of the radio link for communications of the first service type or having the first quality of service requirement separate from the assessment for radio link failure, determining that at least a component carrier of the radio link fails to satisfy the one or more second metrics, where the component carrier is included in the portion of the radio link monitored based at least on the one or more second metrics, and updating the radio link based on the determination without declaring radio link failure.

A non-transitory computer-readable medium storing code for wireless communication is described. The code may include instructions executable by a processor to identify one or more first metrics associated with an RLM procedure on a radio link including one or more component carriers, identify one or more second metrics associated with a procedure for monitoring whether communications of a first service type or having a first quality of service requirement are supportable, monitor the radio link, based on the one or more first metrics, to assess for radio link failure, monitor at least a portion of the radio link, based on the one or more second metrics, to assess the portion of the radio link for communications of the first service type or having the first quality of service requirement separate from the assessment for radio link failure, determine that at least a component carrier of the radio link fails to satisfy the one or more second metrics, where the component carrier is included in the portion of the radio link monitored based at least on the one or more second metrics, and update the radio link based on the determination without declaring radio link failure.

Some examples of the method, apparatuses, and non-transitory computer-readable medium described herein may further include operations, features, means, or instructions for transmitting, to a base station, an indication of the determination, where the updating of the radio link may be triggered by transmission of the indication.

In some examples of the method, apparatuses, and non-transitory computer-readable medium described herein, transmitting the indication may include operations, features, means, or instructions for transmitting the indication on a per component carrier basis.

In some examples of the method, apparatuses, and non-transitory computer-readable medium described herein, transmitting the indication may include operations, features, means, or instructions for transmitting the indication for all component carriers on the radio link collectively.

In some examples of the method, apparatuses, and non-transitory computer-readable medium described herein, transmitting the indication may include operations, features, means, or instructions for transmitting the indication on a per quality of service requirement basis, where each communication may have a corresponding quality of service requirement.

In some examples of the method, apparatuses, and non-transitory computer-readable medium described herein, transmitting the indication may include operations, features, means, or instructions for transmitting the indication on a per service type basis.

In some examples of the method, apparatuses, and non-transitory computer-readable medium described herein, transmitting the indication may include operations, features, means, or instructions for transmitting the indication on either a legacy channel or on a channel corresponding to either the first service type or the first quality of service requirement.

In some examples of the method, apparatuses, and non-transitory computer-readable medium described herein, transmitting the indication may include operations, features, means, or instructions for transmitting the indication over a scheduling request resource.

In some examples of the method, apparatuses, and non-transitory computer-readable medium described herein, transmitting the indication may include operations, features, means, or instructions for transmitting the indication using either a medium access control (MAC) control element or L1-based element.

In some examples of the method, apparatuses, and non-transitory computer-readable medium described herein, transmitting the indication may include operations, features, means, or instructions for transmitting the indication over channels either within a secondary cell group or a master cell group during dual connectivity.

In some examples of the method, apparatuses, and non-transitory computer-readable medium described herein, transmitting the indication may include operations, features, means, or instructions for transmitting the indication over an LTE band when the indication pertains to a non-LTE band.

In some examples of the method, apparatuses, and non-transitory computer-readable medium described herein, monitoring the portion of the radio link may include operations, features, means, or instructions for measuring a signal-to-noise ratio via a reference signal received power (RSRP) on the portion of the radio link.

In some examples of the method, apparatuses, and non-transitory computer-readable medium described herein, monitoring the portion of the radio link may include operations, features, means, or instructions for decoding a virtual PDCCH of a known size or aggregation level provided by radio resource control signaling.

In some examples of the method, apparatuses, and non-transitory computer-readable medium described herein, monitoring the portion of the radio link may include operations, features, means, or instructions for measuring the one or more second metrics on a per component carrier basis.

In some examples of the method, apparatuses, and non-transitory computer-readable medium described herein, monitoring the portion of the radio link may include operations, features, means, or instructions for monitoring the one or more second metrics on a per cell basis.

In some examples of the method, apparatuses, and non-transitory computer-readable medium described herein, monitoring the portion of the radio link may include operations, features, means, or instructions for measuring the one or more second metrics on a per quality of service basis in order to reflect different target block error rates (BLERs).

In some examples of the method, apparatuses, and non-transitory computer-readable medium described herein, monitoring the portion of the radio link may include operations, features, means, or instructions for measuring the one or more second metrics on a per traffic basis.

In some examples of the method, apparatuses, and non-transitory computer-readable medium described herein, monitoring the portion of the radio link may include operations, features, means, or instructions for monitoring the one or more second metrics on a per traffic type basis.

In some examples of the method, apparatuses, and non-transitory computer-readable medium described herein, updating the radio link may include operations, features, means, or instructions for triggering a Radio Resource Control (RRC) reconfiguration for one or more cells for at least one of the first service type or first quality of service requirement.

In some examples of the method, apparatuses, and non-transitory computer-readable medium described herein, triggering the RRC reconfiguration may include operations, features, means, or instructions for triggering at least one of cell reselection, changing of transmission modes, reconfiguring of resource block sets, changing of aggregation levels, or reconfiguring of demodulation reference signals.

In some examples of the method, apparatuses, and non-transitory computer-readable medium described herein, updating the radio link may include operations, features, means, or instructions for triggering a handover procedure where a legacy link may be preserved.

In some examples of the method, apparatuses, and non-transitory computer-readable medium described herein, identifying the one or more second metrics may include operations, features, means, or instructions for receiving a configuration that includes the one or more second metrics.

In some examples of the method, apparatuses, and non-transitory computer-readable medium described herein, the configuration may be specific to at least one of a component carrier, the first service type or the first quality of service requirement.

In some examples of the method, apparatuses, and non-transitory computer-readable medium described herein, the configuration may be based on a transmission time interval length for the portion of the radio link.

In some examples of the method, apparatuses, and non-transitory computer-readable medium described herein, the configuration includes Qin and Qout thresholds that may be different from those used for the RLM procedure.

In some examples of the method, apparatuses, and non-transitory computer-readable medium described herein, the configuration includes n310, n311, or t310 values that may be different from those used for the RLM procedure.

In some examples of the method, apparatuses, and non-transitory computer-readable medium described herein, updating the radio link may include operations, features, means, or instructions for triggering a reconfiguration or reactivation of a semi-persistent scheduling operation.

A method of wireless communication is described. The method may include identifying one or more first metrics associated with an RLM procedure for assessment of radio link failure on a radio link, identifying one or more second metrics associated with a procedure for monitoring whether communications of a first service type or having a first quality of service requirement are supportable, where the procedure for monitoring based at least on the one or more second metrics is separate from the RLM procedure for assessment of radio link failure, receiving an indication from a UE indicating that at least a component carrier of the radio link fails to satisfy the one or more second metrics, and updating the radio link based on the indication without declaring radio link failure.

An apparatus for wireless communication is described. The apparatus may include a processor, memory coupled with the processor, and instructions stored in the memory. The instructions may be executable by the processor to cause the apparatus to identify one or more first metrics associated with an RLM procedure for assessment of radio link failure on a radio link, identify one or more second metrics associated with a procedure for monitoring whether communications of a first service type or having a first quality of service requirement are supportable, where the procedure for monitoring based at least on the one or more second metrics is separate from the RLM procedure for assessment of radio link failure, receive an indication from a UE indicating that at least a component carrier of the radio link fails to satisfy the one or more second metrics, and update the radio link based on the indication without declaring radio link failure.

Another apparatus for wireless communication is described. The apparatus may include means for identifying one or more first metrics associated with an RLM procedure for assessment of radio link failure on a radio link, identifying one or more second metrics associated with a procedure for monitoring whether communications of a first service type or having a first quality of service requirement are supportable, where the procedure for monitoring based at least on the one or more second metrics is separate from the RLM procedure for assessment of radio link failure, receiving an indication from a UE indicating that at least a component carrier of the radio link fails to satisfy the one or more second metrics, and updating the radio link based on the indication without declaring radio link failure.

A non-transitory computer-readable medium storing code for wireless communication is described. The code may include instructions executable by a processor to identify one or more first metrics associated with an RLM procedure for assessment of radio link failure on a radio link, identify one or more second metrics associated with a procedure for monitoring whether communications of a first service type or having a first quality of service requirement are supportable, where the procedure for monitoring based at least on the one or more second metrics is separate from the RLM procedure for assessment of radio link failure, receive an indication from a UE indicating that at least a component carrier of the radio link fails to satisfy the one or more second metrics, and update the radio link based on the indication without declaring radio link failure.

In some examples of the method, apparatuses, and non-transitory computer-readable medium described herein, receiving the indication may include operations, features, means, or instructions for receiving the indication on a per component carrier basis.

In some examples of the method, apparatuses, and non-transitory computer-readable medium described herein, receiving the indication may include operations, features, means, or instructions for receiving the indication for all component carriers on the radio link collectively.

In some examples of the method, apparatuses, and non-transitory computer-readable medium described herein, receiving the indication may include operations, features, means, or instructions for receiving the indication on a per quality of service requirement basis, where each communication may have a corresponding quality of service requirement.

In some examples of the method, apparatuses, and non-transitory computer-readable medium described herein, receiving the indication may include operations, features, means, or instructions for receiving the indication on a per service type basis.

In some examples of the method, apparatuses, and non-transitory computer-readable medium described herein, receiving the indication may include operations, features, means, or instructions for receiving the indication on either a legacy channel or on a channel corresponding to either the first service type or the first quality of service requirement.

In some examples of the method, apparatuses, and non-transitory computer-readable medium described herein, receiving the indication may include operations, features, means, or instructions for receiving the indication over a scheduling request resource.

In some examples of the method, apparatuses, and non-transitory computer-readable medium described herein, receiving the indication may include operations, features, means, or instructions for receiving the indication via either a MAC control element or L1-based element.

In some examples of the method, apparatuses, and non-transitory computer-readable medium described herein, receiving the indication may include operations, features, means, or instructions for receiving the indication over channels either within a secondary cell group or a master cell group during dual connectivity.

In some examples of the method, apparatuses, and non-transitory computer-readable medium described herein, receiving the indication may include operations, features, means, or instructions for receiving the indication over an LTE band when the indication pertains to a non-LTE band.

In some examples of the method, apparatuses, and non-transitory computer-readable medium described herein, updating the radio link may include operations, features, means, or instructions for performing an RRC reconfiguration for one or more cells for at least one of the first service type or first quality of service requirement.

In some examples of the method, apparatuses, and non-transitory computer-readable medium described herein, performing the RRC reconfiguration may include operations, features, means, or instructions for performing at least one of cell reselection, changing of transmission modes, reconfiguring of resource block sets, changing of aggregation levels, or reconfiguring of demodulation reference signals.

In some examples of the method, apparatuses, and non-transitory computer-readable medium described herein, updating the radio link may include operations, features, means, or instructions for performing a handover procedure where a legacy link may be preserved.

In some examples of the method, apparatuses, and non-transitory computer-readable medium described herein, identifying the one or more second metrics may include operations, features, means, or instructions for transmitting a configuration that includes the one or more second metrics.

In some examples of the method, apparatuses, and non-transitory computer-readable medium described herein, the configuration may be specific to at least one of a component carrier, the first service type or the first quality of service requirement.

In some examples of the method, apparatuses, and non-transitory computer-readable medium described herein, the configuration may be based on a transmission time interval length for the portion of the radio link.

In some examples of the method, apparatuses, and non-transitory computer-readable medium described herein, the configuration includes Qin and Qout thresholds that may be different from those used for the RLM procedure.

In some examples of the method, apparatuses, and non-transitory computer-readable medium described herein, the configuration includes n310, n311, or t310 values that may be different from those used for the RLM procedure.

In some examples of the method, apparatuses, and non-transitory computer-readable medium described herein, updating the radio link may include operations, features, means, or instructions for performing a reconfiguration or reactivation of a semi-persistent scheduling operation.

DETAILED DESCRIPTION

Figure 1:
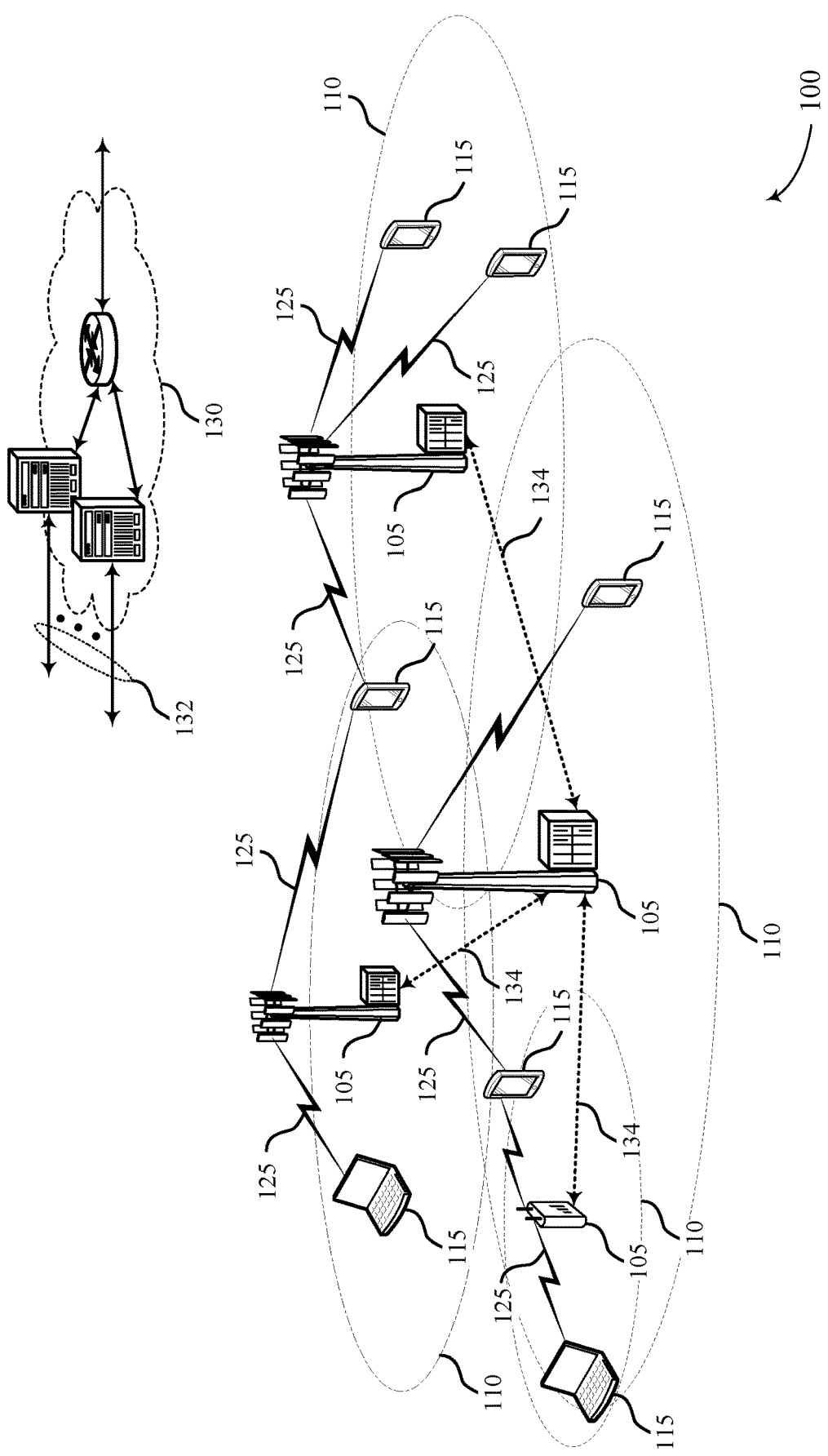
FIG. 1 illustrates an example of a system for wireless communications that supports link quality monitoring, signaling and procedures for specific service types in accordance with aspects of the present disclosure.

A base station may provide multiple types of wireless communications services to a user equipment (UE) in a wireless communications network. For example, the base station may provide low latency communications services and legacy communications services or mobile broadband (MBB) communications. A radio link established between the UE and the base station may include multiple wireless carriers (e.g., component carriers or primary and secondary cells) used for the services. The different services may have different reliability requirements. For example, the low latency carrier may have more stringent reliability requirements than the MBB carrier.

The UE may monitor the radio link for radio link failure (RLF). If RLF occurs, the UE and the base station may re-establish the radio link, which may take a long time and prevent communication using the radio link. The UE may receive reference signals transmitted by the base station on each carrier of the radio link. Based on the signal strength of the reference signals and a set of metrics associated with the radio link, the UE may determine if the downlink transmissions are decodable with an acceptable error rate. The UE may detect whether the radio link has experienced RLF based on a number of successful or unsuccessful decodings and the set of metrics associated with the radio link, and the UE may report to the base station if RLF has occurred. Some wireless communications systems use a single set of metrics associated with one type of service to determine if RLF for the radio link has occurred. However, different types of services provided by the radio link may have different reliability requirements. Thus, metrics associated with one type of service may not reliably or efficiently detect RLF for other types of services.

UEs and base stations described herein may implement techniques to inform the base station that a type of service or a quality of service (QoS) level for that type of services is not supportable. For example, the UE may receive a configuration including a second set of metrics different from the first set of metrics. Based on the second set of metrics, the UE may determine whether certain reliability requirements can be met by one or more of the carriers and whether a type of service or QoS level for the type of service can be supported by the radio link. For example, the UE may determine that the radio link can support MBB communications, but not low latency communications. The UE may transmit an indication to the base station that low latency communications cannot be supported, and the base station and the UE may update the radio link without declaring RLF and dismantling the radio link. For example, the radio link may drop, reconfigure, or handover the low latency carrier without adjusting or stopping use of the legacy or MBB carrier.

Aspects of the disclosure are initially described in the context of a wireless communications system. Aspects of the disclosure are further illustrated by and described with reference to apparatus diagrams, system diagrams, and flowcharts that relate to link quality monitoring, signaling and procedures for specific service types.

FIG. 1 illustrates an example of a wireless communications system 100 that supports link quality monitoring, signaling and procedures for specific service types in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive via beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved UTRA (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiple access (OFDM) or discrete Fourier transform-spread-OFDM (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and a base station 105 of the wireless communications system 100 may implement techniques to inform the base station 105 that a type of service or a QoS level for that type of services is not supportable, without declaring RLF and dismantling the radio link. The UE 115 may receive a configuration including a second set of metrics different from a first set of metrics used to determine RLF. Based on the second set of metrics, the UE 115 may determine whether a certain reliability requirements can be met by one or more of the carriers and whether a type of service or QoS level for the type of service can be supported by the radio link. The UE 115 may transmit an indication to the base station 105 that a type of service or a QoS level for the type of service cannot be supported, and the base station 105 and the UE 115 may update the radio link without declaring RLF and dismantling the radio link.

Figure 2:
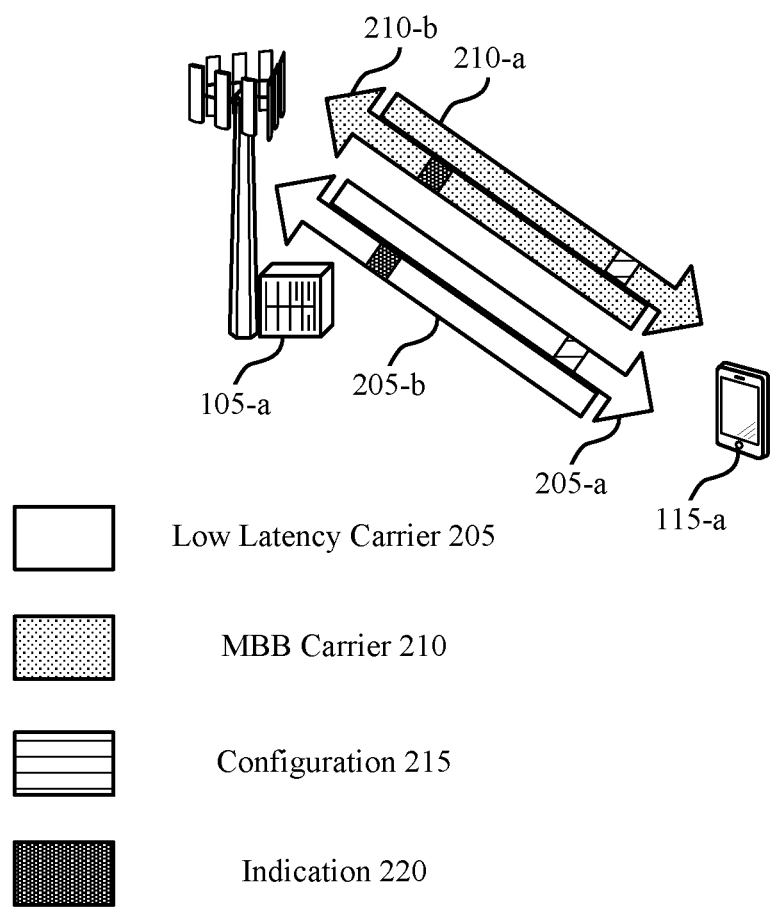
FIG. 2 illustrates an example of a wireless communications system that supports link quality monitoring, signaling and procedures for specific service types in accordance with aspects of the present disclosure.

FIG. 2 illustrates an example of a wireless communications system 200 that supports link quality monitoring, signaling and procedures for specific service types in accordance with aspects of the present disclosure. In some examples, wireless communications system 200 may implement aspects of wireless communications system 100.

Base station 105-a may provide multiple wireless communications services to UE 115-a. For example, base station 105-a may provide low latency communications services, such as ultra-reliable low latency communications (URLLC), and legacy communications services, such as MBB communications. A radio link established between UE 115-a and base station 105-a may include one or more wireless carriers (e.g., component carriers) used for the services. The low latency communications may be transmitted and received on a low latency carrier 205, and the legacy or MBB communications may be transmitted and received on an MBB carrier 210. The low latency carrier 205 and the MBB carrier 210 may include downlink carriers and, in some examples, uplink carriers. In some cases, the low latency carrier 205 and the MBB carrier 210 may be respective examples of a secondary cell and a primary cell provided by base station 105-a. In some other examples, the low latency carrier 205 may be the primary cell, and the MBB carrier 210 may be an example of a secondary cell. In some cases, the wireless carriers may be examples of component carriers in a carrier aggregation configuration.

The different services may have different reliability requirements. For example, the low latency carrier 205 may have more stringent reliability requirements than the MBB carrier 210. In some cases, MBB services may require a block error rate (BLER) of 10% or less, while URLLC services may require a BLER of $10^{-5}$ (e.g., 0.001%).

UE 115-a may monitor the radio link for RLF. If RLF occurs, UE 115-a and base station 105-a may re-establish the radio link, which may prevent communication using the radio link. To monitor the radio link, UE 115-a may monitor for downlink reference signals transmitted by base station 105-a. Based on the signal strength of the reference signals, UE 115-a may determine whether a downlink transmission (e.g., a PDCCH transmission) is decodable. If UE 115-a receives the reference signals with a sufficient signal strength, UE 115-a may be able to decode the PDCCH transmission. However, if the reference signals do not have sufficient signal strength, UE 115-a may not attempt to decode the PDCCH transmission, which may be an indicator that UE 115-a is out of sync with base station 105-a and that the radio link may have failed.

UE 115-a may use a first set of metrics to determine whether RLF has occurred. In some cases, the first set of metrics may be based on a number of consecutive out of sync downlink subframes. The first set of metrics and techniques for detecting RLF are described in more detail in FIG. 3.

Other wireless communications systems use a single set of metrics associated with one wireless communications service to determine if RLF for the radio link has occurred. However, different services provided by the radio link may have different reliability requirements. Thus, metrics associated with one type of service may not be reliable or efficient for detecting RLF for other types of services.

For example, the RLF metrics may be based on low latency communications. If the radio link is unable to support low latency communications, other wireless systems may also declare RLF for an MBB carrier provided by the radio link, although the radio link may satisfy MBB reliability requirements. In this example, the UE 115-*a* may re-establish the radio link. In other examples, the RLF metrics may be based on MBB communications. If the radio link does not meet reliability conditions for low latency, the low latency carrier may not be used, but the low latency carrier may also not declare RLF. Thus, using RLF metrics based on one wireless communications service for a radio link providing multiple different services may lead to reduced throughput and increased latency due to unused carriers or refraining from transmitting to re-establish the radio link.

The wireless communications system 200 may instead use new metrics, signaling, and procedures to inform base station 105-*a* that a type of service or a quality of service (QoS) level for that type of service is not supportable. For example, UE 115-*a* may use a first set of metrics for detecting RLF and a second set of metrics, including the new metrics, for radio link monitoring (RLM) and updating a radio link without declaring RLF. UE 115-*a* may receive a configuration 215 including the second set of metrics on, for example, downlink low latency carrier 205-*a*, downlink MBB carrier 210-*a*, or via RRC signaling. UE 115-*a* may transmit an indication 220 of the measured metrics to base station 105-*a*, and UE 115-*a* and base station 105-*a* may update the radio link without declaring RLF. The indication 220 may be transmitted on the uplink low latency carrier 205-*b* or the uplink MBB carrier 210-*b*.

The second set of metrics may include an RLM-like metric. The second set of metrics may be measured by UE 115-*a* based on signal to noise ratio (SNR) values of the carriers. Based on the new metrics, UE 115-*a* may determine whether a certain BLER requirement can be met by one or more of the carriers and whether a type of service or QoS level for the type of service can be supported. The second set of metrics are described in more detail in FIGS. 3 and 4. For example, UE 115-*a* may determine that the radio link can support MBB communications, but not low latency communications. UE 115-*a* may transmit an indication 220 to base station 105-*a* that low latency communications cannot be supported, and base station 105-*a* and UE 115-*a* may update the radio link without declaring RLF and dismantling the radio link. For example, base station 105-*a* or UE 115-*a* may drop the low latency carrier 205 from the radio link or adjust a QoS of the low latency carrier 205. Other examples of radio link updating procedures are described in more detail in FIG. 4.

UE 115-*a* may receive a configuration 215 from base station 105-*a* including the second set of metrics. In some cases, the configuration 215 may be transmitted in higher layer signaling, such as via RRC signaling, or the configuration 215 may be transmitted in downlink control information (e.g., on one of the downlink carriers 205-*a* or 205-*b*). In some cases, the second set of metrics may be measured for each component carrier. In some other examples, the second set of metrics may be measured only on one cell (e.g., the primary cell).

In some cases, UE 115-*a* may support multiple traffic types or wireless communications services. In a first example, the measurements may be performed for each traffic type separately. Each service may have a specific BLER target or different PDCCH sizes. For example, a first type of traffic may require less than 10% BLER, a second type of traffic may require less than 5% BLER, and a third type of traffic may require less than 1% BLER. UE 115-*a* may measure reference signals for each type of traffic independently and determine whether each type of traffic satisfies the BLER targets. In some cases, measuring the traffic types separately may provide more precise determinations for each traffic type. In some other examples, the measurements may be performed for only one traffic type. For example, if UE 115-*a* supports multiple low latency services with different requirements, UE 115-*a* may consider the most stringent requirements among the different low latency services. In the example above, UE 115-*a* may consider only the 1% BLER target and measure the other traffics based on the 1% BLER target.

In some examples, UE 115-*a* may monitor the radio link to determine whether the radio link can support a specific service on a specific carrier, and UE 115-*a* may also monitor the radio link to determine whether RLF has occurred for the specific carrier or for the radio link. Thus, UE 115-*a* may implement a tiered RLF procedure, where UE 115-*a* first determines which services on specific carriers can be supported, then UE 115-*a* may determine which carriers can be supported, then UE 115-*a* may determine whether the radio link can be supported. In some cases, the tiers or severities of the RLF procedure may be detected at different points. For example, UE 115-*a* may first detect that a component carrier cannot be supported before determining that a service on the component carrier cannot be supported. UE 115-*a* may transmit an indication 220 based on the tier of the RLF procedure or based on what cannot be supported. For example, if UE 115-*a* detects RLF of the first tier, UE 115-*a* may transmit an indication 220 which triggers reconfiguration of the service or a reconfiguration of the QoS level of the service on the carrier. If UE 115-*a* detects RLF of the second tier, UE 115-*a* may transmit an indication 220 which triggers reconfiguration of the carrier or a handover procedure. If UE 115-*a* detects RLF of the third tier, the radio link may be reconfigured.

UE 115-*a* may determine what can be supported and transmit an indication 220 of the determination to base station 105-*a*. Different indication formats or procedures may be implemented based on how the second set of metrics are measured, or which metrics are included in the second set of metrics. For example, an indication 220 may be sent for each component carrier separately, or an indication 220 may be sent for the entire radio link (e.g., including all component carriers). In some cases, an indication 220 may be sent for individual reliability requirements (e.g., latency, BLER targets, etc.). For example, the indication 220 may indicate that the radio link cannot support a BLER target of 1%, but the radio link may support a BLER target of 5% or 10%, etc. In some other examples, an indication 220 may be transmitted for a specific type of service, indicating that the radio link or specific component carriers of the radio link cannot support a specific type of service or a level of reliability for a specific type of service.

In some cases, UE 115-*a* may use a legacy channel to transmit the indication 220, which may correspond to the MBB carrier 210, or other channels used for a specific type of service to transmit the indication 220. If, for example, the low latency carrier 205 does not meet reliability requirements and uses a mini-slot or shortened TTI, either the low latency channels, a channel using an NR slot, or a channel using an LTE subframe may be used to transmit the indication 220. In some examples, UE 115-a may transmit the indication 220 over a scheduling request resource. In some cases, the scheduling request resources may be configured to UE 115-a just to transmit the indication 220. Base station 105-a may indicate a configuration of the scheduling request resources to UE 115-a, including a number of physical uplink control channel (PUCCH) resource blocks, a PUCCH format, cyclic shift information, DMRS location information, etc. In some other examples, UE 115-a may include the indication 220 in a MAC CE, or a level 1 based element (e.g., the scheduling request resource).

The indication 220 may trigger different events or different behaviors from base station 105-a. For example, the indication 220 may trigger RRC reconfiguration for one cell or for all cells provided to UE 115-a. In an example, the indication 220 may trigger RRC reconfiguration for a cell which is indicated to be unable to provide a type of service or a level of reliability for a service. In some examples, the indication 220 may trigger RRC reconfiguration for a given requirement set or for cells providing a given type of service (e.g., MBB or low latency). For example, if the indication 220 indicates that the radio link cannot support low latency communications, any cell providing low latency communications may be reconfigured. In some cases, base station 105-a may configure another secondary cell. In some examples, base station 105-a may change a transmission mode for a cell, or reconfigure resource block sets, aggregation levels, DMRS configurations or any other parameter which may be configured by RRC.

Additionally, or alternatively, the indication 220 may initiate a handover procedure. For example, the indication 220 may trigger an early handover procedure, a conditional handover, or a service-based handover. The radio link with the old cell may be preserved from the current cell while the handover operation is performed. The handover operation may be initiated based on the inability of the radio link to support a specific service.

UE 115-a may determine whether the radio link can support one or more wireless communications services based on considering a virtual control channel (e.g., a virtual PDCCH) of a given size and other parameters, such as aggregation level. Thus, UE 115-a may maintain a legacy link (e.g., the MBB carrier 210) while undergoing the handover. The parameters for the virtual PDCCH may be indicated by RRC signaling.

In some cases, a procedure may be introduced to handle semi-persistent scheduling (SPS). The indication 220 may be related to SPS operation. In some cases, the indication 220 may trigger re-configuration or re-activation of the SPS operation. In cases of dual connectivity (e.g., two separate base stations 105 provide NR and NR, LTE and LTE, or NR and LTE services), the indication 220 for the secondary cell group may be sent over channels within the secondary cell group or over the master cell group. For NR services, the indication 220 may be sent on an LTE band, which may be a lower frequency band with higher reliability of reception.

Figure 3:
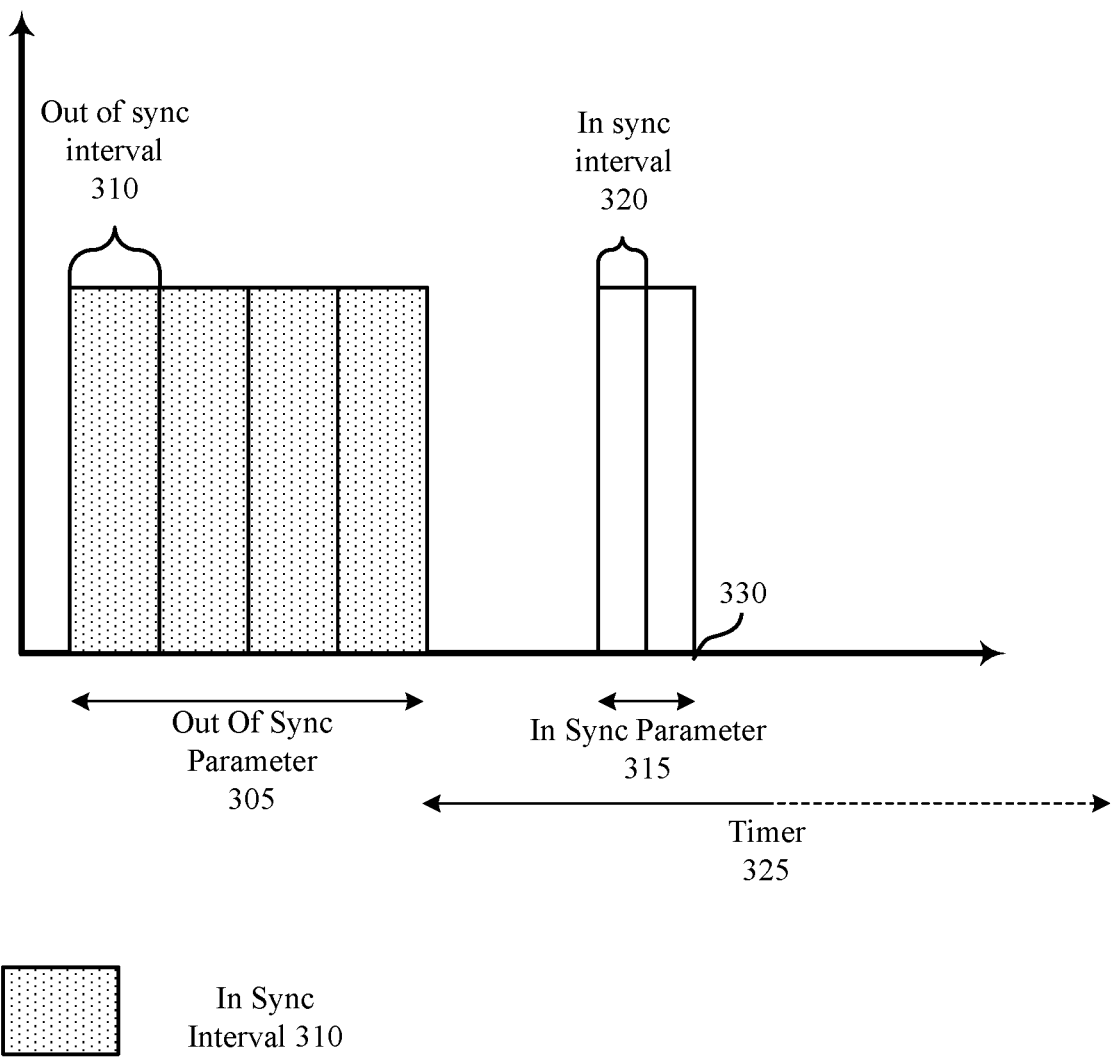
FIG. 3 illustrates an example of a radio link sync detection that supports link quality monitoring, signaling and procedures for specific service types in accordance with aspects of the present disclosure.

FIG. 3 illustrates an example of a radio link sync detection 300 that supports link quality monitoring, signaling and procedures for specific service types in accordance with aspects of the present disclosure. In some examples, radio link sync detection 300 may implement aspects of wireless communications system 100.

As described in FIG. 2, a UE 115 may perform radio link monitoring to determine whether the UE 115 is in sync with a serving cell, or if RLF has occurred. The UE 115 may monitor reference signals in a downlink transmission from a base station 105. The UE 115 may determine if it can decode the PDCCH transmission based on a certain set of parameters associated with the wireless communications system. The set of parameters may include a set of metrics which the UE 115 measures to determine the status of the radio link. If the reference signals have sufficient signal strength (e.g., satisfying a threshold) so that the UE 115 may consistently decode the PDCCH transmission, then the radio link is in sync. If the reference signals do not have sufficient signal strength for the UE 115 to decode PDCCH, the link is out of sync.

The UE 115 uses a first set of metrics to determine whether the link is in sync or if RLF has occurred. An out of sync parameter 305 indicates the number of intervals (e.g., an out of sync interval 310) when the UE 115 is unable to successfully decode the PDCCH transmission due to low reference signal received power (RSRP) detected. The out of sync parameter 305 may be referred to as n310. In some cases, the out of sync intervals 310 may be 200 ms long, or 20 consecutive frames in the downlink. In the illustrated example, the out of sync parameter 305, or n310, is equal to 4, showing 4 consecutive out of sync intervals 310.

After detecting a number of out of sync intervals 310 equal to the out of sync parameter 305, the UE 115 may start a timer 325. The timer 325 may be referred to as timer t310. The timer 325 may be measured in seconds and used to allow the UE 115 to get back in synchronization with the base station 105. For example, if the UE 115 can successfully decode a number of in sync intervals 320 equal to an in sync parameter 315 before the timer 325 expires, the UE 115 may assume the radio link is resynchronized and the radio link has not failed. The in sync parameter 315 may be referred to as parameter n311. In the illustrated example, the parameter n311 is equal to 2. Therefore, in the illustrated example, the UE 115 determines the radio link is synchronized at 330, after successfully decoding the second in sync interval 320, and the timer 325 may be stopped (indicated by the dotted lines which continue for the full duration of the timer 325). In some cases, the in sync interval 320 may span 100 ms, or 10 consecutive frames.

If the timer 325 expires before the UE 115 can successfully decode a number of in sync intervals 320 equal to the in sync parameter 315, the UE 115 may determine that RLF has occurred. The UE 115 may then attempt to reconnect by transmitting an RRC connection reestablishment request message to the primary cell.

The first set of metrics used to determine RLF may include thresholds for determining whether a downlink transmission can be reliably received. A threshold, Qout, may be the threshold at which the downlink transmission cannot be reliably received while the timer 325 is not active. For example, if Qout is 10% and the timer 325 is not active, any downlink transmission received with 10% BLER or higher may not be considered decodable. If the UE 115 receives a 200 ms period of downlink frames with 10% or higher BLER, that 200 ms period of downlink frames may be considered an out of sync interval 310.

Another threshold, Qin, may be the threshold at which a downlink transmission cannot be reliably received while the timer 325 is active. In some cases, Qin may be smaller than Qout, such that the UE 115 has higher reception quality expectations for resynchronizing than falling out of sync. For example, if Qin is 2% and the timer 325 is active, a downlink transmission must have less than 2% BLER to be considered decodable. If the UE 115 receives a 100 ms period of decodable downlink frames satisfying Qin, that 100 ms period may be considered an in sync interval 320.

A UE 115 described herein may also utilize a second set of metrics for RLM, which the UE 115 may use to update the radio link without declaring RLF has occurred. If one communications service or component carrier has poor signal quality or does not satisfy a measured metric, the UE 115 may update or reconfigure the failing service or component carrier without affecting other communications services or component carriers. Examples of this determining and updating are described in more detail in FIG. 4. In some cases, the UE 115 may receive a configuration from the base station 105 including the second set of metrics. Updating the radio link without declaring RLF may improve throughput for the UE 115. For example, the UE 115 may implement techniques to improve the conditions without having to reconfigure each configured component carrier. These techniques may also advantageously enable a UE 115 to meet stringent reliability requirements for some low latency communications schemes. For example, if a non-low latency component carrier would experience RLF, the UE 115 may implement techniques to update the radio link for the non-low latency component carrier without declaring failure for the low latency carrier, which may stop communications on the low latency carrier.

For example, the second set of metrics may include a second Qin and a second Qout. The second Qin and the second Qout may be configured for a specific component carrier or for a specific service type. The second Qin and second Qout may be based on the reliability requirements for the carrier or service type. In some cases, the second Qin and the second Qout may be based on TTI length.

The second set of metrics may include additional timers and parameters, such as a second parameter n310, a second parameter n311, and a second timer t310. The additional timer and parameters may be configured for a specific component carrier or service. The second parameter n310, second parameter n311, and second timer t310 may be configured based on a reliability requirement for the carriers or services. In some cases, these additional timers and parameters may also be configured based on TTI length.

Figure 4:
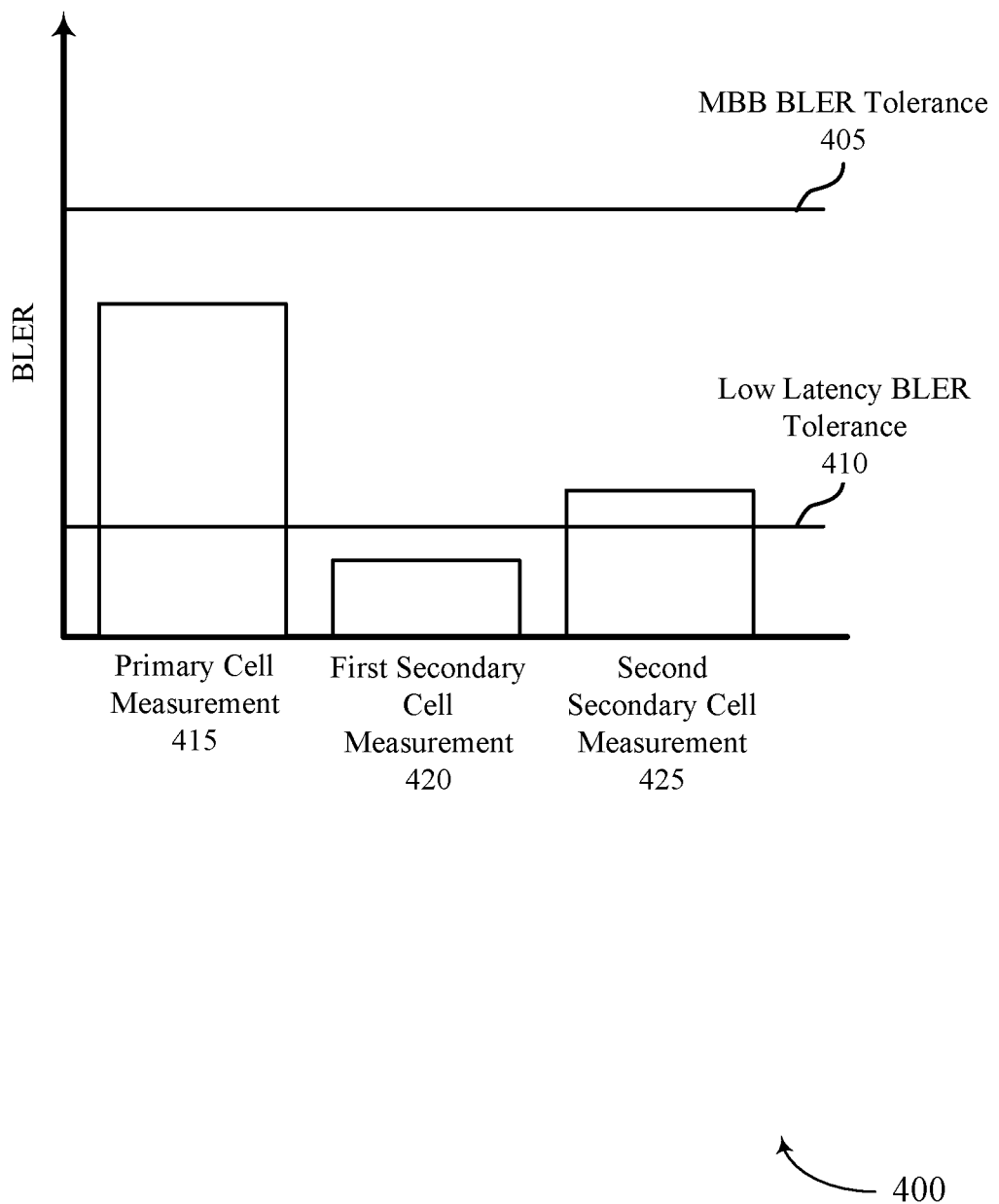
FIG. 4 illustrates an example of a metric measurement that supports link quality monitoring, signaling and procedures for specific service types in accordance with aspects of the present disclosure.

FIG. 4 illustrates an example of a metric measurement 400 that supports link quality monitoring, signaling and procedures for specific service types in accordance with aspects of the present disclosure. In some examples, the metric measurement 400 may implement aspects of wireless communications system 100. The metric measurement 400 shows BLER measurement for a UE 115 that is provided a primary cell and two secondary cells by a base station 105. The primary cell and the two secondary cells may be examples of component carriers in a carrier aggregation configuration.

In an example, the primary cell may be configured for MBB communications, and the secondary cells may be configured for low latency communications. In the first example, each of the cells are considered synchronized, or no timers t310 are active. A first set of metrics for determining RLF may be based on MBB communications, including a first parameter n310 (e.g., parameter n310-*a*), a first parameter n311 (e.g., parameter n311-*a*), first timer t310 (e.g., timer t310-*a*), a first Qout (e.g., Qout-a), and a first Qin (e.g., Qin-a). The MBB BLER tolerance 405 may be an example of the first Qout (e.g., Qout-a).

The UE 115 may receive a configuration from the base station 105 including a second set of metrics related to low latency communications. The second set of metrics may include a second parameter n310 (e.g., parameter n310-*b*), a second parameter n311 (e.g., parameter n311-*b*), a second timer t310 (e.g., timer t310-*b*), a second Qout (e.g., Qout-b), and a second Qin (e.g., Qin-b). The low latency BLER tolerance 410 may be an example of the second Qout (e.g., Qout-b). The UE 115 may monitor the primary cell and secondary cells based on the first set of metrics to detect RLF, and the UE 115 may monitor the secondary cells based on the second set of metrics. In some other examples, the configuration may include a set of metrics for each configured secondary cell or for each wireless communications service.

The UE 115 may receive downlink reference signals on the component carriers and measure an SNR value for the reference signals such as RSRP. The UE 115 may estimate a BLER value for PDCCH transmission on each cell based on the measured RSRP, for example by considering a virtual PDCCH of the same size and aggregation level. If a primary cell measurement 415 satisfies the MBB BLER tolerance 405, the UE 115 may determine that the PDCCH transmission on the primary cell can be successfully decoded. Otherwise, the UE 115 may determine that the PDCCH cannot be successfully decoded, and the UE 115 may be out of sync. As shown, the primary cell measurement 415 satisfies the MBB BLER tolerance 405. Therefore, the primary cell may be considered in sync.

The UE 115 may also estimate a first secondary cell measurement 420 and a second secondary cell measurement 425 for the first secondary cell and the second secondary cell, respectively. As shown, the first secondary cell measurement 420 may be below the low latency BLER tolerance 410. Thus, the first secondary cell may be in sync. However, the second secondary cell measurement 425 may have an estimated BLER measurement which is above the low latency BLER tolerance 410.

The UE 115 may determine whether the second secondary cell has had a number of consecutive out of sync intervals equal to the n310-*b* parameter of the second set of metrics. If the second secondary cell has had n310-*b* consecutive out of sync intervals, the second secondary cell may not be synchronized. The UE 115 may start the timer t310-*b* for the second secondary cell. If the UE 115 does not detect n311-*b* consecutive in sync time intervals within the timer t310-*b*, the UE 115 may determine that the second secondary cell cannot support low latency communications. While the timer t310-*b* is active, the UE 115 may monitor the PDCCH and determine whether the PDCCH can be successfully decoded to satisfy the Qout-b value.

The UE 115 may then transmit an indication that the second secondary cell cannot support low latency communications to the base station 105. In some cases, the indication may be sent just for the second secondary cell, or the indication may be transmitted for all of the carriers collectively. In some other examples, the indication may be transmitted for any cell providing the same type of service as the second secondary cell. For example, the UE 115 may indicate that the radio link cannot sufficiently support low latency communications. In some examples, the indication may include information related to a QoS level of the secondary cells and whether the secondary cells can meet certain BLER targets or not. The UE 115 may transmit the indication on the primary cell or any of the secondary cells.

In some cases, the UE 115 may be configured resources for a scheduling request, and the UE 115 may transmit the indication on the resources configured for the scheduling request. Or, in some cases, the UE 115 may use a MAC CE to indicate that the second secondary cell cannot support low latency communications.

The UE 115 and the base station 105 may implement techniques to update the radio link without declaring RLF and without initiating a full RRC configuration reestablishment. In an example, the UE 115 may maintain a legacy carrier (e.g., the primary cell) while updating or reconfiguring cells providing low latency communications (e.g., the secondary cells). In some cases, only the cell which cannot meet its reliability requirements may be reconfigured, or any cells providing the type of service may be reconfigured. For example, either only the second secondary cell may be reconfigured, or both of the secondary cells may be reconfigured based on both of the secondary cells providing low latency communications.

For example, the UE 115 may transmit an RRC reconfiguration for the second secondary cell, or the UE 115 may be handed over from the second secondary cell to another cell. The handover operation may be triggered based on the inability of the second secondary cell to support a specific service, such as low latency communications in this example.

In some cases, a secondary cell may operate according to a set of metrics indicated in the configuration, and the UE 115 may not apply the first set of metrics to determine whether the secondary cell is synchronized. For example, the secondary cell may satisfy the second set of metrics, but not the first set of metrics, and the secondary cell may be considered synchronized. In some cases, the first secondary cell and the second secondary cell may provide the same type of traffic (e.g., low latency), but the cells may have different sets of metrics. Thus, the primary cell may satisfy only the first set of metrics, the first secondary cell may satisfy only the second set of metrics, and the second secondary cell may satisfy only a third set of metrics. In some other examples, each secondary cell may be configured with a unique set of metrics. In some other examples, cells providing the same wireless communications service (e.g., MBB or low latency) may have the same set of metrics, where different wireless communications services have different sets of metrics.

Figure 5:
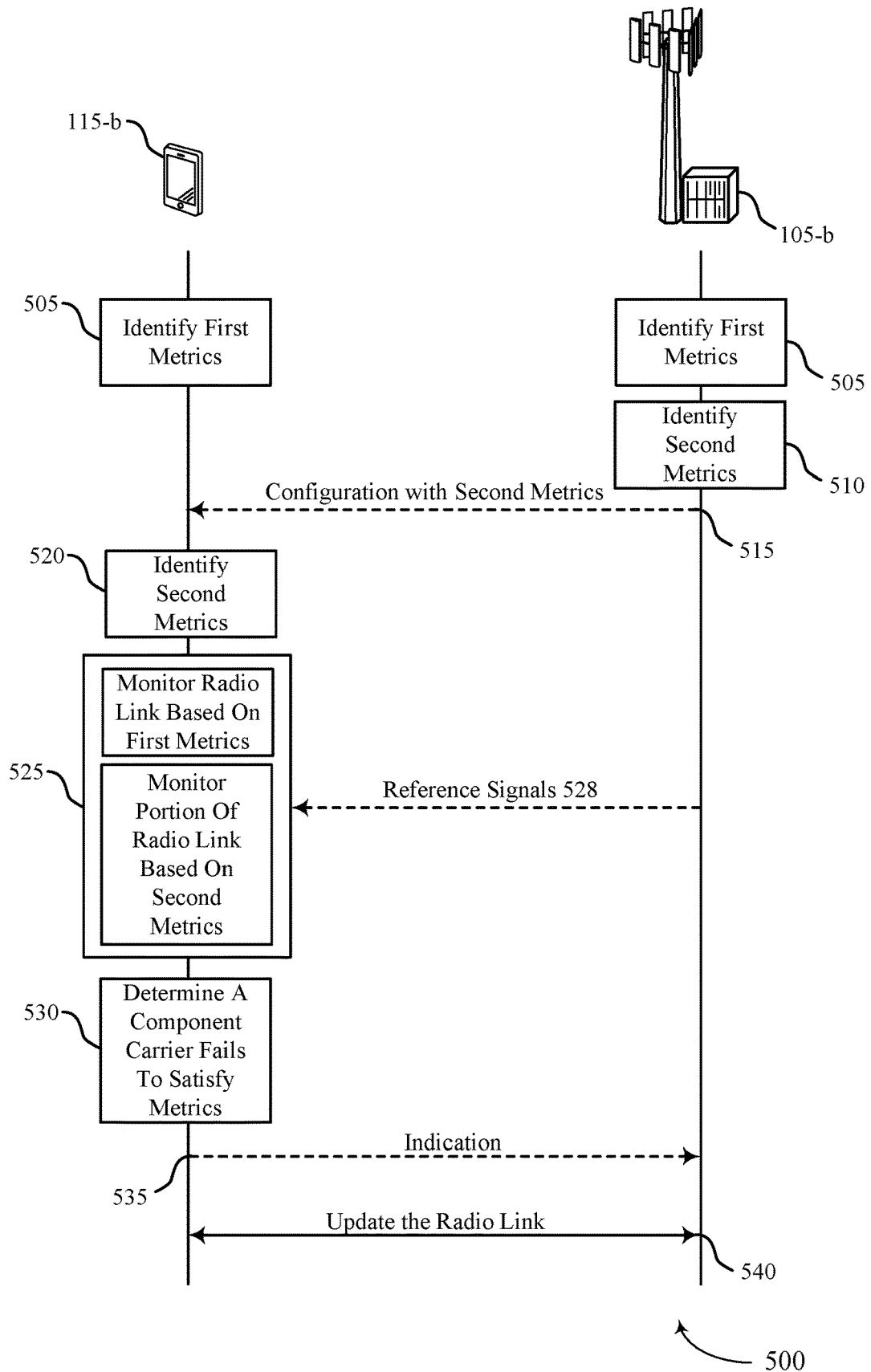
FIG. 5 illustrates an example of a process flow that supports link quality monitoring, signaling and procedures for specific service types in accordance with aspects of the present disclosure.

FIG. 5 illustrates an example of a process flow 500 that supports link quality monitoring, signaling and procedures for specific service types in accordance with aspects of the present disclosure. In some examples, process flow 500 may implement aspects of wireless communications system 100. Process flow 500 includes UE 115-b and base station 105-b, which may be respective examples of a UE 115 and a base station 105 as described herein.

At 505, UE 115-b and base station 105-b may identify one or more first metrics associated with an RLM procedure for assessment of radio link failure on a radio link.

At 510, base station 105-b may identify one or more second metrics associated with a procedure for monitoring whether communications of a first service type or having a first quality of service requirement are supportable, where the procedure for monitoring based on the one or more second metrics is separate from the RLM procedure for assessment of radio link failure. In some cases, at 515, base station 105-b may transmit a configuration that includes the one or more second metrics to UE 115-b. At 520, UE 115-b may identify the one or more second metrics associated with the procedure. In some cases, UE 115-b may identify the one or more second metrics based on the configuration transmitted by base station 105-b.

During 525, UE 115-b may monitor the radio link. Base station 105-b may transmit reference signals 528 in downlink transmissions (e.g., PDCCH transmissions) to UE 115-b on the radio link during 525. UE 115-b may monitor the radio link based on the one or more first metrics to assess for RLF. UE 115-b may monitor at least a portion of the radio link based on the one or more second metrics to assess the portion of the radio link for communications of the first service type or having the first quality of service requirement separate from the assessment for radio link failure.

At 530, UE 115-b may determine that at least a component carrier of the radio link fails to satisfy the one or more second metrics, where the component carrier is included in the portion of the radio link monitored based on the one or more second metrics. In some cases, at 535, UE 115-b may transmit, to base station 105-b, an indication of the determination. At 540, UE 115-b and base station 105-b may update the radio link based on the determination without declaring RLF. In some cases, the updating of the radio link is triggered by transmission of the indication.

Figure 6:
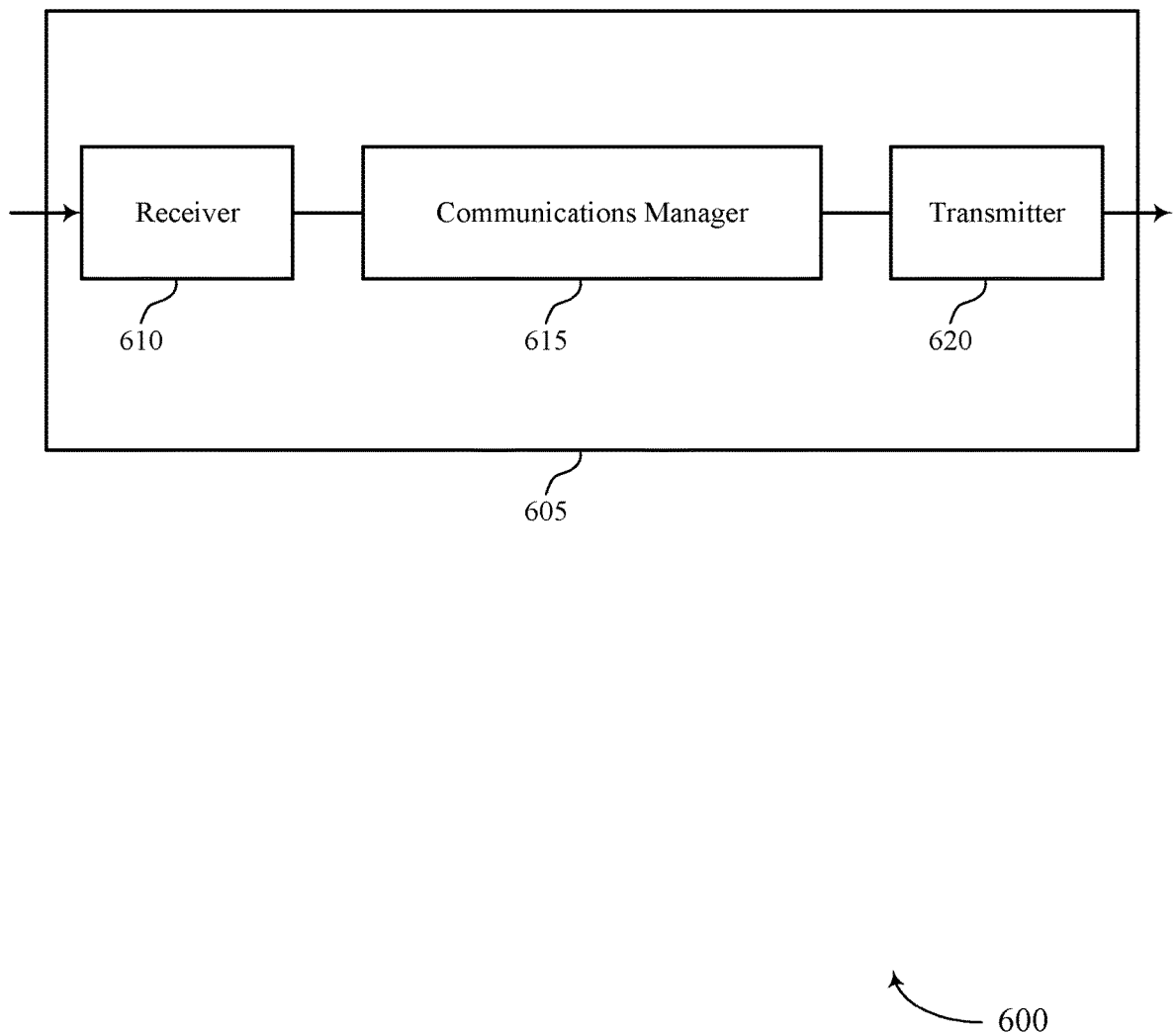
FIGS. 6 and 7 show block diagrams of devices that support link quality monitoring, signaling and procedures for specific service types in accordance with aspects of the present disclosure.

FIG. 6 shows a block diagram 600 of a device 605 that supports link quality monitoring, signaling and procedures for specific service types in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to link quality monitoring, signaling and procedures for specific service types, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify one or more first metrics associated with an RLM procedure on a radio link including one or more component carriers, identify one or more second metrics associated with a procedure for monitoring whether communications of a first service type or having a first quality of service requirement are supportable, monitor the radio link, based on the one or more first metrics, to assess for radio link failure, monitor at least a portion of the radio link, based on the one or more second metrics, to assess the portion of the radio link for communications of the first service type or having the first quality of service requirement separate from the assessment for radio link failure, determine that at least a component carrier of the radio link fails to satisfy the one or more second metrics, where the component carrier is included in the portion of the radio link monitored based on the one or more second metrics, and update the radio link based on the determination without declaring radio link failure. The communications manager 615 may be an example of aspects of the communications manager 910 described herein.

The actions performed by the communications manager 615 as described herein may be implemented to realize one or more potential advantages. One implementation may allow a UE 115 to meet stringent reliability and latency requirements for some low latency communications. For example, the enhanced techniques for detecting conditions which may lead to RLF (e.g., based on monitoring metrics for different traffic types) may support the UE 115 to more ameliorate effects which would cause RLF without declaring RLF. If the UE 115 can more reliably detect conditions which would lead to RLF, the UE 115 may also be able to implement techniques to update the radio link and fix those conditions. Thus, the techniques described herein may also improve throughput for the UE 115.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
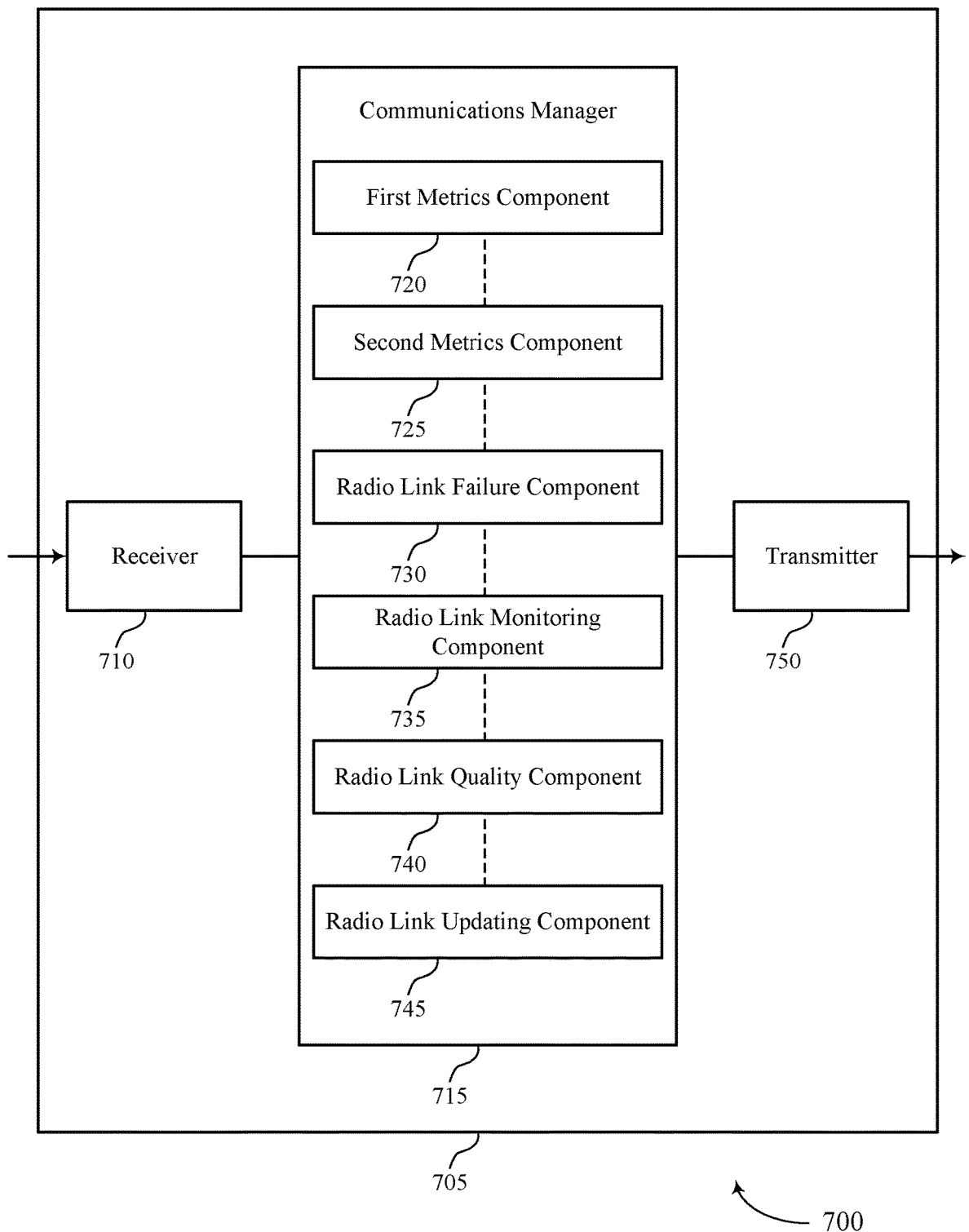

FIG. 7 shows a block diagram 700 of a device 705 that supports link quality monitoring, signaling and procedures for specific service types in accordance with aspects of the present disclosure. The device 705 may be an example of aspects of a device 605 or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to link quality monitoring, signaling and procedures for specific service types, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a first metrics component 720, a second metrics component 725, a radio link failure component 730, a radio link monitoring component 735, a radio link quality component 740, and a radio link updating component 745. The communications manager 715 may be an example of aspects of the communications manager 910 described herein.

The first metrics component 720 may identify one or more first metrics associated with an RLM procedure on a radio link including one or more component carriers. The second metrics component 725 may identify one or more second metrics associated with a procedure for monitoring whether communications of a first service type or having a first quality of service requirement are supportable. The radio link failure component 730 may monitor the radio link, based on the one or more first metrics, to assess for radio link failure. The radio link monitoring component 735 may monitor at least a portion of the radio link, based on the one or more second metrics, to assess the portion of the radio link for communications of the first service type or having the first quality of service requirement separate from the assessment for radio link failure. The radio link quality component 740 may determine that at least a component carrier of the radio link fails to satisfy the one or more second metrics, where the component carrier is included in the portion of the radio link monitored based on the one or more second metrics. The radio link updating component 745 may update the radio link based on the determination without declaring radio link failure.

Based on determining that a component carrier of the radio link fails to satisfy a metric, a processor of a UE 115 (e.g., controlling the receiver 710, the transmitter 750, or the transceiver 920 as described with reference to FIG. 9) may efficiently determine that the UE 115 is experiencing conditions which may lead to RLF without declaring RLF. The processor may then update the radio link to ameliorate the conditions which may lead to RLF, which may improve communication quality for the UE 115. The processor of the UE 115 may turn on one or more processing units for determining how to update the radio link, transmitting signaling for the radio link update, and metric monitoring to check whether the channel conditions have improved, or similar mechanisms within the UE 115. As such, when conditions which may lead to RLF are detected (e.g., based on certain metrics not being met), the processor may be ready to update the radio link to improve the radio link quality without declaring RLF.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
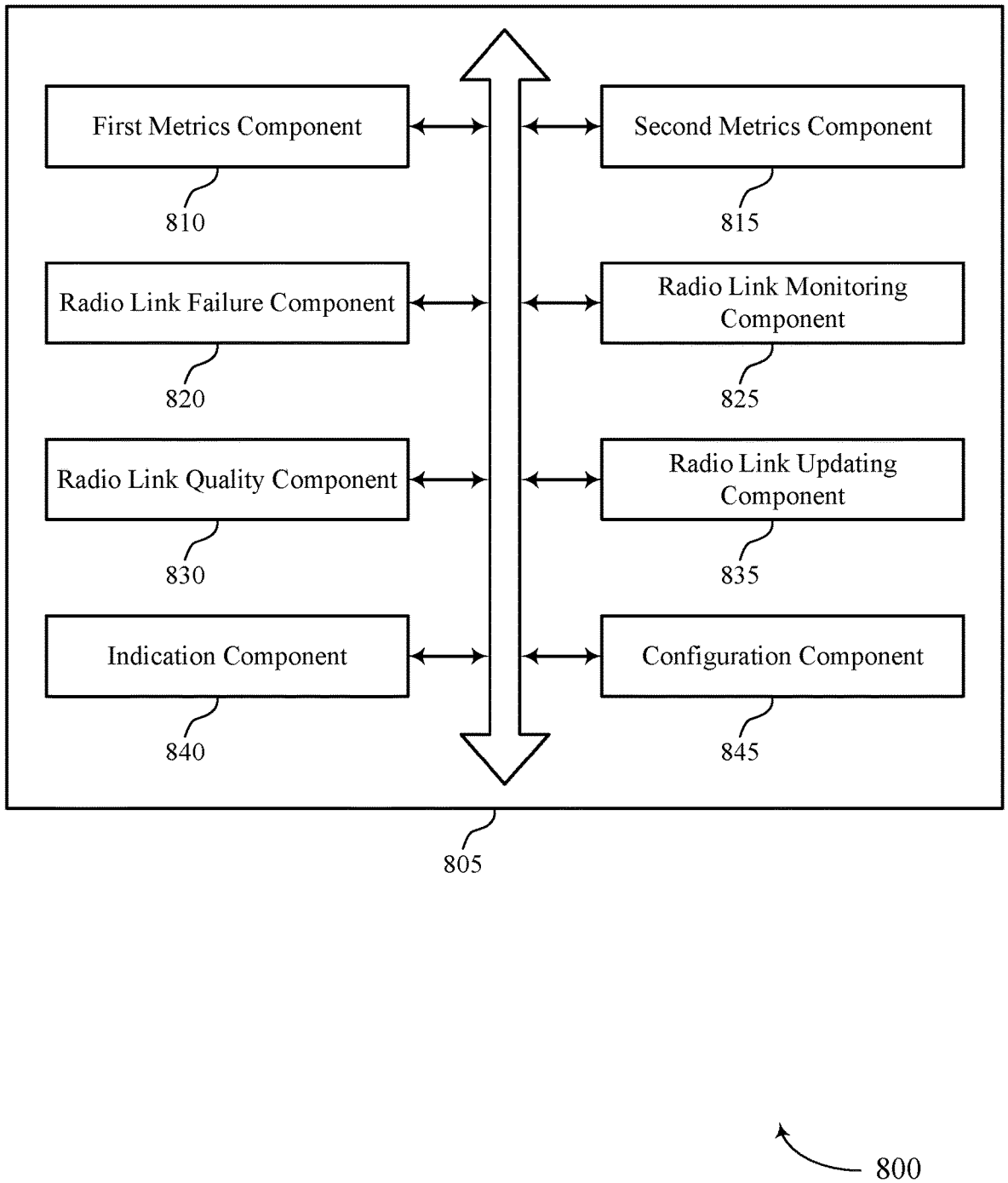
FIG. 8 shows a block diagram of a communications manager that supports link quality monitoring, signaling and procedures for specific service types in accordance with aspects of the present disclosure.

FIG. 8 shows a block diagram 800 of a communications manager 805 that supports link quality monitoring, signaling and procedures for specific service types in accordance with aspects of the present disclosure. The communications manager 805 may be an example of aspects of a communications manager 615, a communications manager 715, or a communications manager 910 described herein. The communications manager 805 may include a first metrics component 810, a second metrics component 815, a radio link failure component 820, a radio link monitoring component 825, a radio link quality component 830, a radio link updating component 835, an indication component 840, and a configuration component 845. Each of these modules may communicate, directly or indirectly, with one another (e.g., via one or more buses).

The first metrics component 810 may identify one or more first metrics associated with an RLM procedure on a radio link including one or more component carriers.

The second metrics component 815 may identify one or more second metrics associated with a procedure for monitoring whether communications of a first service type or having a first quality of service requirement are supportable.

The radio link failure component 820 may monitor the radio link, based on the one or more first metrics, to assess for radio link failure.

The radio link monitoring component 825 may monitor at least a portion of the radio link, based on the one or more second metrics, to assess the portion of the radio link for communications of the first service type or having the first quality of service requirement separate from the assessment for radio link failure.

In some examples, the radio link monitoring component 825 may measure a signal-to-noise ratio via an RSRP on the portion of the radio link. In some examples, the radio link monitoring component 825 may decode a virtual PDCCH of a known size or aggregation level provided by radio resource control signaling.

In some examples, the radio link monitoring component 825 may measure the one or more second metrics on a per component carrier basis. In some examples, the radio link monitoring component 825 may monitor the one or more second metrics on a per cell basis.

In some examples, the radio link monitoring component 825 may measure the one or more second metrics on a per quality of service basis in order to reflect different target BLERs. In some examples, the radio link monitoring component 825 may measure the one or more second metrics on a per traffic basis. In some examples, the radio link monitoring component 825 may monitor the one or more second metrics on a per traffic type basis.

The radio link quality component 830 may determine that at least a component carrier of the radio link fails to satisfy the one or more second metrics, where the component carrier is included in the portion of the radio link monitored based on the one or more second metrics. The radio link updating component 835 may update the radio link based on the determination without declaring radio link failure.

In some examples, the radio link updating component 835 may trigger an RRC reconfiguration for one or more cells for at least one of the first service type or first quality of service requirement. In some examples, the radio link updating component 835 may trigger at least one of cell reselection, changing of transmission modes, reconfiguring of resource block sets, changing of aggregation levels, or reconfiguring of demodulation reference signals.

In some examples, the radio link updating component 835 may trigger a handover procedure where a legacy link is preserved. In some examples, the radio link updating component 835 may trigger a reconfiguration or reactivation of a semi-persistent scheduling operation.

The indication component 840 may transmit, to a base station, an indication of the determination, where the updating of the radio link is triggered by transmission of the indication. In some examples, the indication component 840 may transmit the indication on a per component carrier basis. In some examples, the indication component 840 may transmit the indication for all component carriers on the radio link collectively.

In some examples, the indication component 840 may transmit the indication on a per quality of service requirement basis, where each communication has a corresponding quality of service requirement. In some examples, the indication component 840 may transmit the indication on a per service type basis. In some examples, the indication component 840 may transmit the indication on either a legacy channel or on a channel corresponding to either the first service type or the first quality of service requirement.

In some examples, the indication component 840 may transmit the indication over a scheduling request resource. In some examples, the indication component 840 may transmit the indication using either a MAC control element or L1-based element. In some examples, the indication component 840 may transmit the indication over channels either within a secondary cell group or a master cell group during dual connectivity. In some examples, the indication component 840 may transmit the indication over an LTE band when the indication pertains to a non-LTE band.

The configuration component 845 may receive a configuration that includes the one or more second metrics. In some cases, the configuration is specific to at least one of a component carrier, the first service type or the first quality of service requirement. In some cases, the configuration is based on a transmission time interval length for the portion of the radio link. In some cases, the configuration includes Qin and Qout thresholds that are different from those used for the RLM procedure. In some cases, the configuration includes n310, n311, or t310 values that are different from those used for the RLM procedure.

Figure 9:
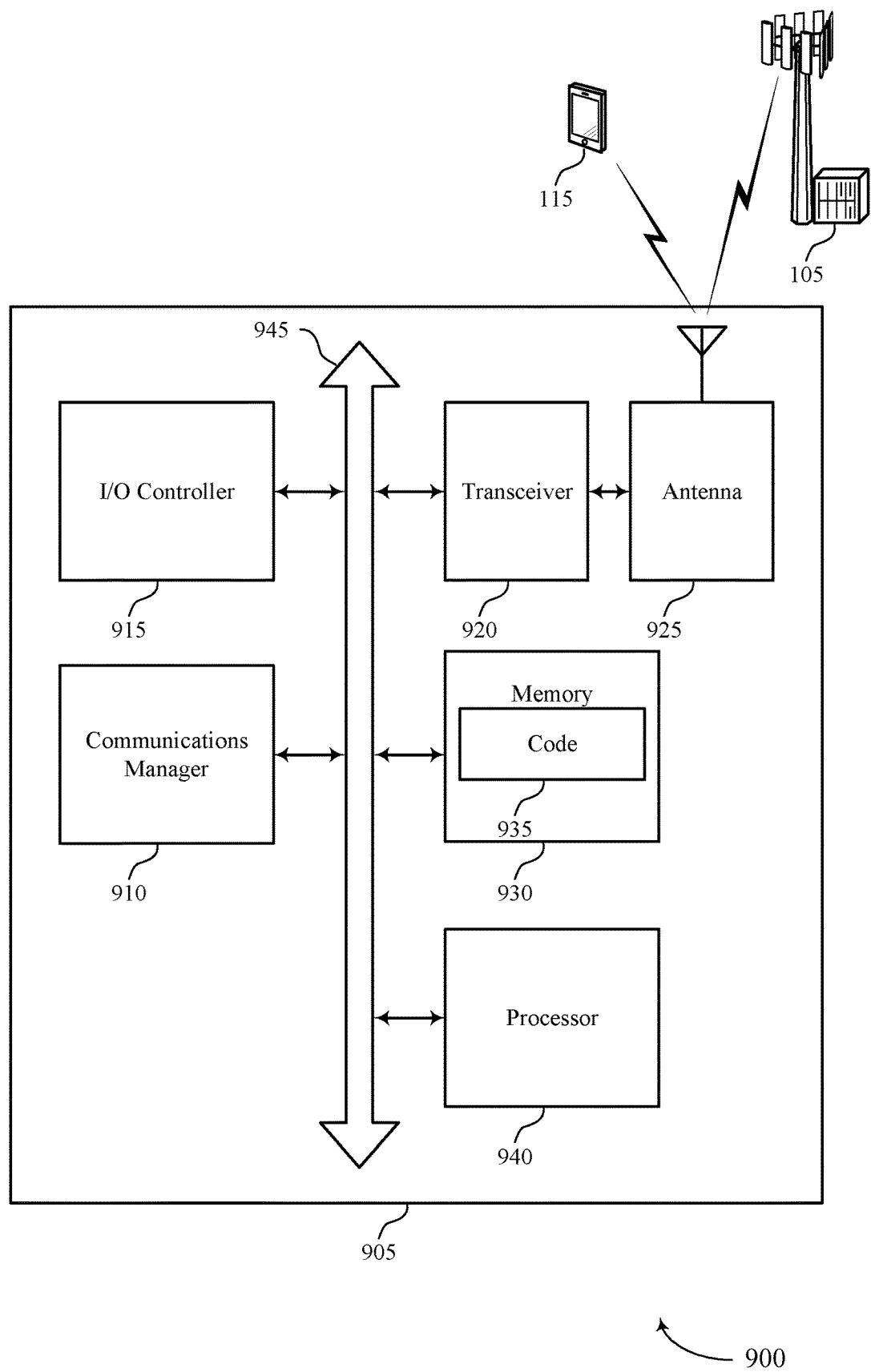
FIG. 9 shows a diagram of a system including a device that supports link quality monitoring, signaling and procedures for specific service types in accordance with aspects of the present disclosure.

FIG. 9 shows a diagram of a system 900 including a device 905 that supports link quality monitoring, signaling and procedures for specific service types in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify one or more first metrics associated with a radio link monitoring (RLM) procedure on a radio link including one or more component carriers, identify one or more second metrics associated with a procedure for monitoring whether communications of a first service type or having a first quality of service requirement are supportable, monitor the radio link, based on the one or more first metrics, to assess for radio link failure, monitor at least a portion of the radio link, based on the one or more second metrics, to assess the portion of the radio link for communications of the first service type or having the first quality of service requirement separate from the assessment for radio link failure, determine that at least a component carrier of the radio link fails to satisfy the one or more second metrics, where the component carrier is included in the portion of the radio link monitored based on the one or more second metrics, and update the radio link based on the determination without declaring radio link failure.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a PLD, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting link quality monitoring, signaling and procedures for specific service types).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
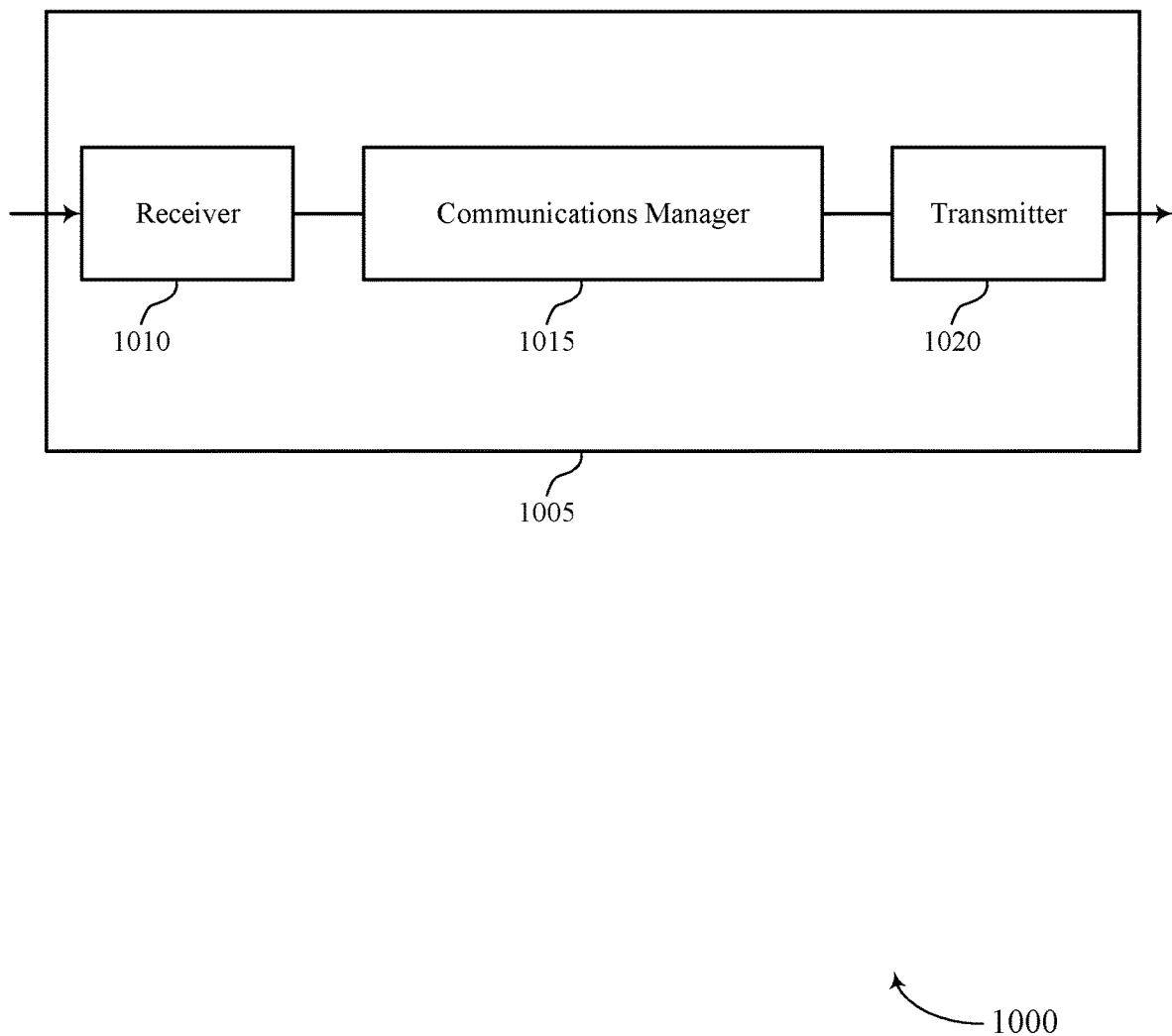
FIGS. 10 and 11 show block diagrams of devices that support link quality monitoring, signaling and procedures for specific service types in accordance with aspects of the present disclosure.

FIG. 10 shows a block diagram 1000 of a device 1005 that supports link quality monitoring, signaling and procedures for specific service types in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to link quality monitoring, signaling and procedures for specific service types, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify one or more first metrics associated with a radio link monitoring (RLM) procedure on a radio link including one or more component carriers, identify one or more second metrics associated with a procedure for monitoring whether communications of a first service type or having a first quality of service requirement are supportable, where the procedure for monitoring based on the one or more second metrics is separate from the RLM procedure for assessment of radio link failure, receive an indication from a UE indicating that at least a component carrier of the radio link fails to satisfy the one or more second metrics, and update the radio link based on the indication without declaring radio link failure. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other PLD, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
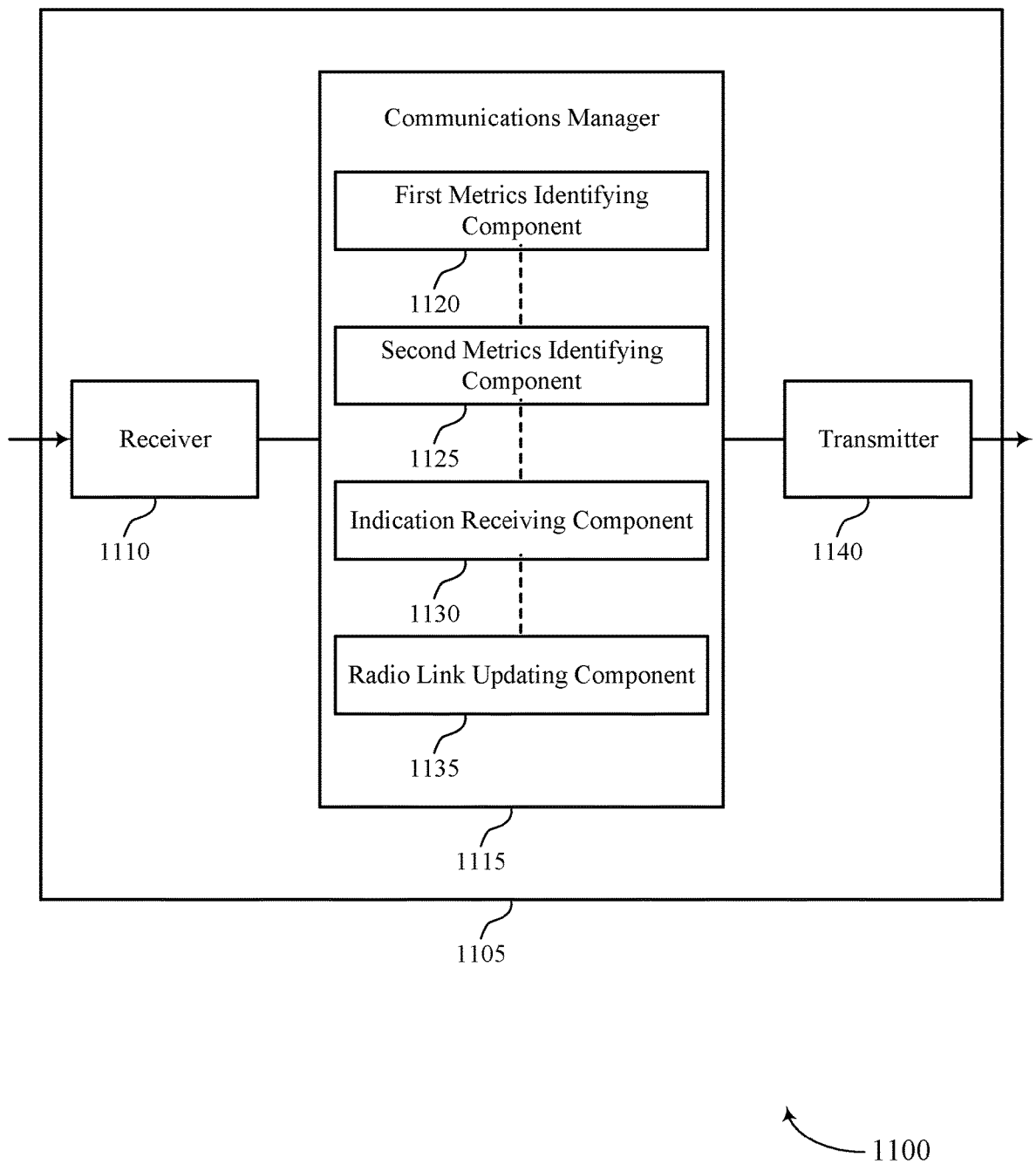

FIG. 11 shows a block diagram 1100 of a device 1105 that supports link quality monitoring, signaling and procedures for specific service types in accordance with aspects of the present disclosure. The device 1105 may be an example of aspects of a device 1005 or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to link quality monitoring, signaling and procedures for specific service types, etc.). Information may be passed on to other components of the device 1105.

The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a first metrics identifying component 1120, a second metrics identifying component 1125, an indication receiving component 1130, and a radio link updating component 1135. The communications manager 1115 may be an example of aspects of the communications manager 1310 described herein.

The first metrics identifying component 1120 may identify one or more first metrics associated with an RLM procedure for assessment of radio link failure on a radio link. The second metrics identifying component 1125 may identify one or more second metrics associated with a procedure for monitoring whether communications of a first service type or having a first quality of service requirement are supportable, where the procedure for monitoring based on the one or more second metrics is separate from the RLM procedure for assessment of radio link failure. The indication receiving component 1130 may receive an indication from a UE indicating that at least a component carrier of the radio link fails to satisfy the one or more second metrics. The radio link updating component 1135 may update the radio link based on the indication without declaring radio link failure.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
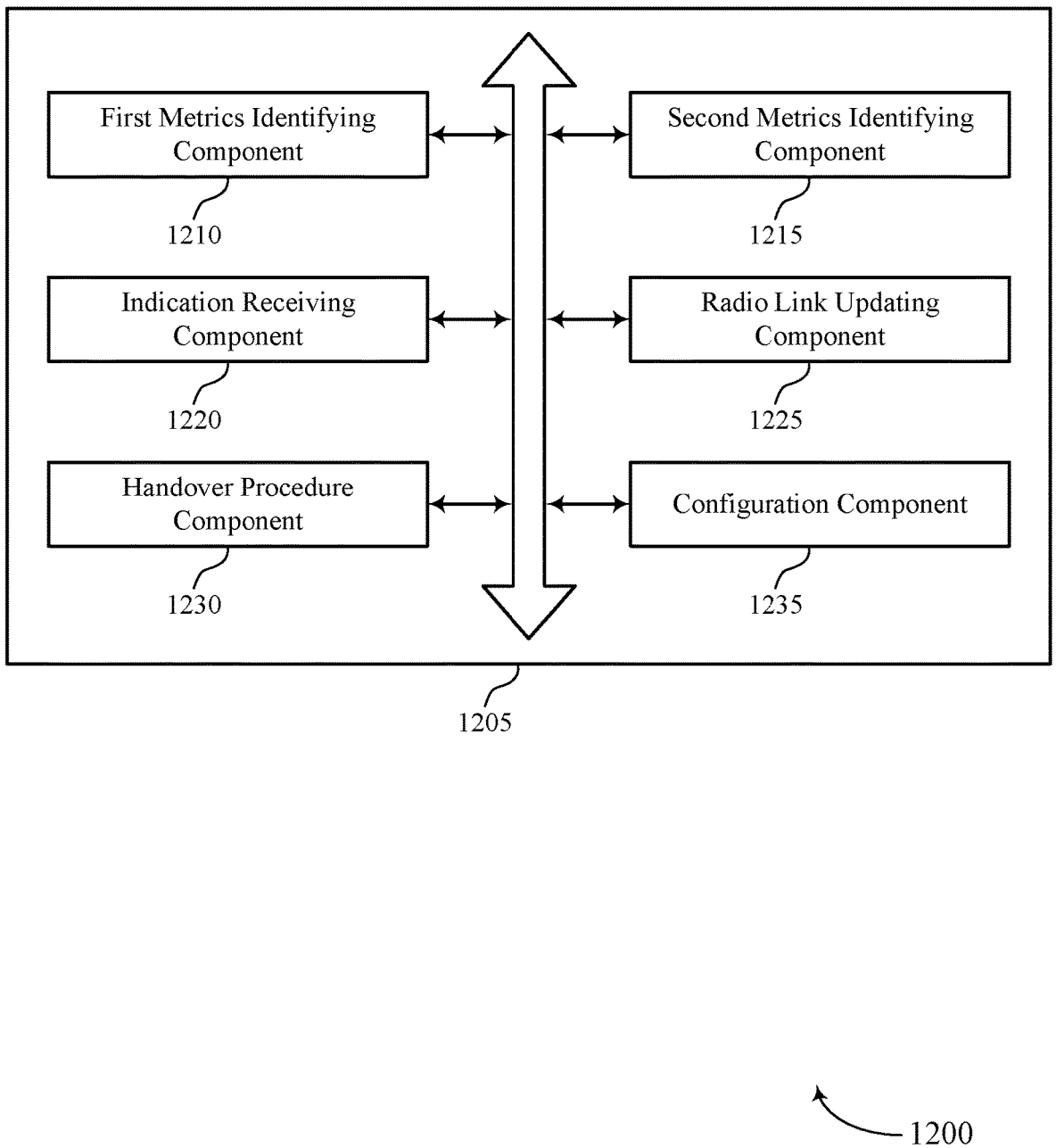
FIG. 12 shows a block diagram of a communications manager that supports link quality monitoring, signaling and procedures for specific service types in accordance with aspects of the present disclosure.

FIG. 12 shows a block diagram 1200 of a communications manager 1205 that supports link quality monitoring, signaling and procedures for specific service types in accordance with aspects of the present disclosure. The communications manager 1205 may be an example of aspects of a communications manager 1015, a communications manager 1115, or a communications manager 1310 described herein. The communications manager 1205 may include a first metrics identifying component 1210, a second metrics identifying component 1215, an indication receiving component 1220, a radio link updating component 1225, a handover procedure component 1230, and a configuration component 1235. Each of these modules may communicate, directly or indirectly, with one another (e.g., via one or more buses).

The first metrics identifying component 1210 may identify one or more first metrics associated with an RLM procedure for assessment of radio link failure on a radio link. The second metrics identifying component 1215 may identify one or more second metrics associated with a procedure for monitoring whether communications of a first service type or having a first quality of service requirement are supportable, where the procedure for monitoring based on the one or more second metrics is separate from the RLM procedure for assessment of radio link failure. The indication receiving component 1220 may receive an indication from a UE indicating that at least a component carrier of the radio link fails to satisfy the one or more second metrics.

In some examples, the indication receiving component 1220 may receive the indication on a per component carrier basis. In some examples, the indication receiving component 1220 may receive the indication for all component carriers on the radio link collectively. In some examples, the indication receiving component 1220 may receive the indication on a per quality of service requirement basis, where each communication has a corresponding quality of service requirement.

In some examples, the indication receiving component 1220 may receive the indication on a per service type basis. In some examples, the indication receiving component 1220 may receive the indication on either a legacy channel or on a channel corresponding to either the first service type or the first quality of service requirement. In some examples, the indication receiving component 1220 may receive the indication over a scheduling request resource.

In some examples, the indication receiving component 1220 may receive the indication via either a MAC control element or L1-based element. In some examples, the indication receiving component 1220 may receive the indication over channels either within a secondary cell group or a master cell group during dual connectivity. In some examples, the indication receiving component 1220 may receive the indication over an LTE band when the indication pertains to a non-LTE band.

The radio link updating component 1225 may update the radio link based on the indication without declaring radio link failure. In some examples, the radio link updating component 1225 may perform an RRC reconfiguration for one or more cells for at least one of the first service type or first quality of service requirement. In some examples, the radio link updating component 1225 may perform at least one of cell reselection, changing of transmission modes, reconfiguring of resource block sets, changing of aggregation levels, or reconfiguring of demodulation reference signals. In some examples, the radio link updating component 1225 may perform a reconfiguration or reactivation of a semi-persistent scheduling operation. The handover procedure component 1230 may perform a handover procedure where a legacy link is preserved.

The configuration component 1235 may transmit a configuration that includes the one or more second metrics. In some cases, the configuration is specific to at least one of a component carrier, the first service type or the first quality of service requirement. In some cases, the configuration is based on a transmission time interval length for the portion of the radio link. In some cases, the configuration includes Qin and Qout thresholds that are different from those used for the RLM procedure. In some cases, the configuration includes n310, n311, or t310 values that are different from those used for the RLM procedure.

Figure 13:
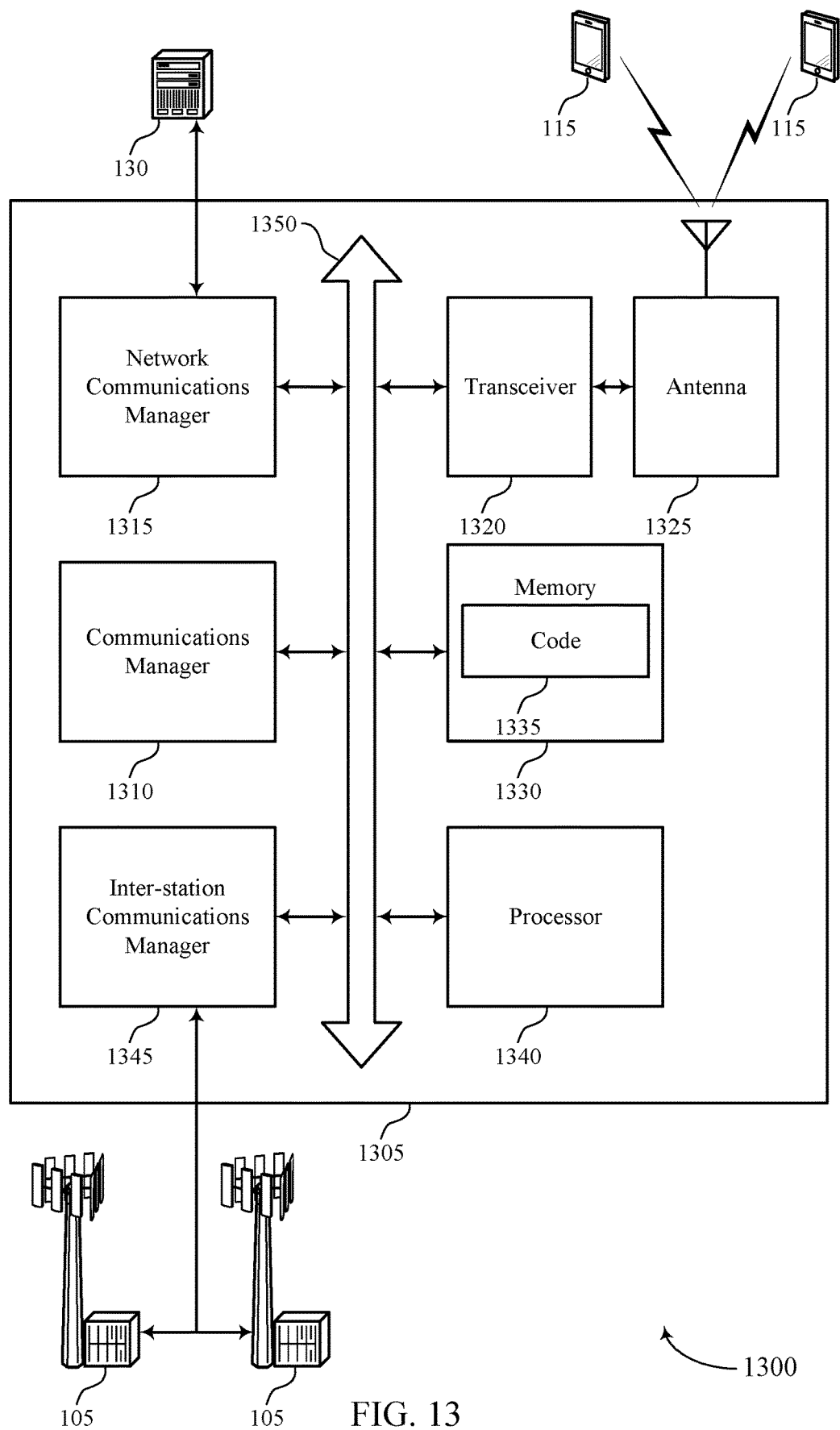
FIG. 13 shows a diagram of a system including a device that supports link quality monitoring, signaling and procedures for specific service types in accordance with aspects of the present disclosure.

FIG. 13 shows a diagram of a system 1300 including a device 1305 that supports link quality monitoring, signaling and procedures for specific service types in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify one or more first metrics associated with an RLM procedure for assessment of radio link failure on a radio link, identify one or more second metrics associated with a procedure for monitoring whether communications of a first service type or having a first quality of service requirement are supportable, where the procedure for monitoring based on the one or more second metrics is separate from the RLM procedure for assessment of radio link failure, receive an indication from a UE indicating that at least a component carrier of the radio link fails to satisfy the one or more second metrics, and update the radio link based on the indication without declaring radio link failure.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a PLD, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting link quality monitoring, signaling and procedures for specific service types).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
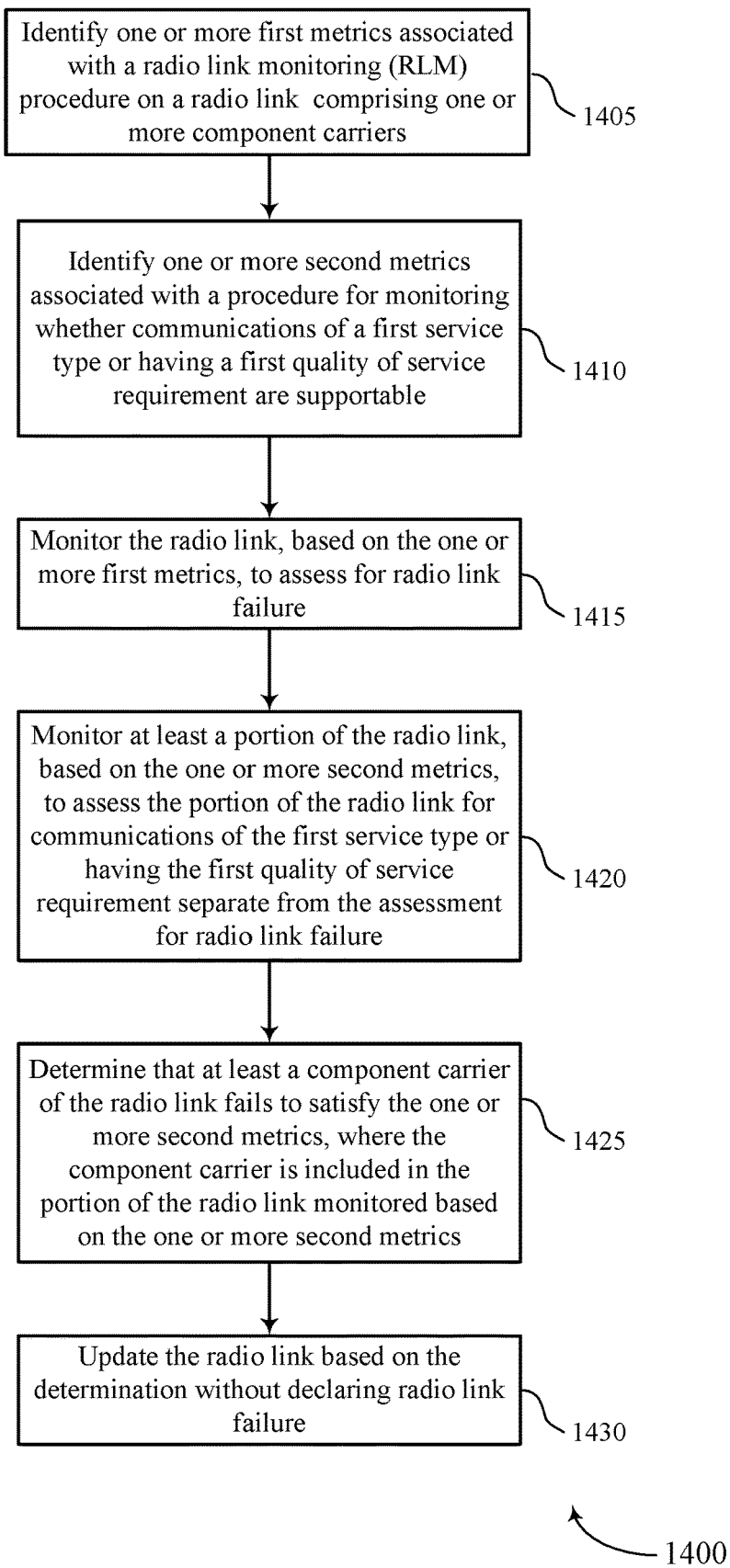
FIGS. 14 through 16 show flowcharts illustrating methods that support link quality monitoring, signaling and procedures for specific service types in accordance with aspects of the present disclosure.

FIG. 14 shows a flowchart illustrating a method 1400 that supports link quality monitoring, signaling and procedures for specific service types in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify one or more first metrics associated with an RLM procedure on a radio link including one or more component carriers. The operations of 1405 may be performed according to the methods described herein. In some examples, aspects of the operations of 1405 may be performed by a first metrics component as described with reference to FIGS. 6 through 9.

At 1410, the UE may identify one or more second metrics associated with a procedure for monitoring whether communications of a first service type or having a first quality of service requirement are supportable. The operations of 1410 may be performed according to the methods described herein. In some examples, aspects of the operations of 1410 may be performed by a second metrics component as described with reference to FIGS. 6 through 9.

At 1415, the UE may monitor the radio link, based on the one or more first metrics, to assess for radio link failure. The operations of 1415 may be performed according to the methods described herein. In some examples, aspects of the operations of 1415 may be performed by a radio link failure component as described with reference to FIGS. 6 through 9.

At 1420, the UE may monitor at least a portion of the radio link, based on the one or more second metrics, to assess the portion of the radio link for communications of the first service type or having the first quality of service requirement separate from the assessment for radio link failure. The operations of 1420 may be performed according to the methods described herein. In some examples, aspects of the operations of 1420 may be performed by a radio link monitoring component as described with reference to FIGS. 6 through 9.

At 1425, the UE may determine that at least a component carrier of the radio link fails to satisfy the one or more second metrics, where the component carrier is included in the portion of the radio link monitored based on the one or more second metrics. The operations of 1425 may be performed according to the methods described herein. In some examples, aspects of the operations of 1425 may be performed by a radio link quality component as described with reference to FIGS. 6 through 9.

At 1430, the UE may update the radio link based on the determination without declaring radio link failure. The operations of 1430 may be performed according to the methods described herein. In some examples, aspects of the operations of 1430 may be performed by a radio link updating component as described with reference to FIGS. 6 through 9.

Figure 15:
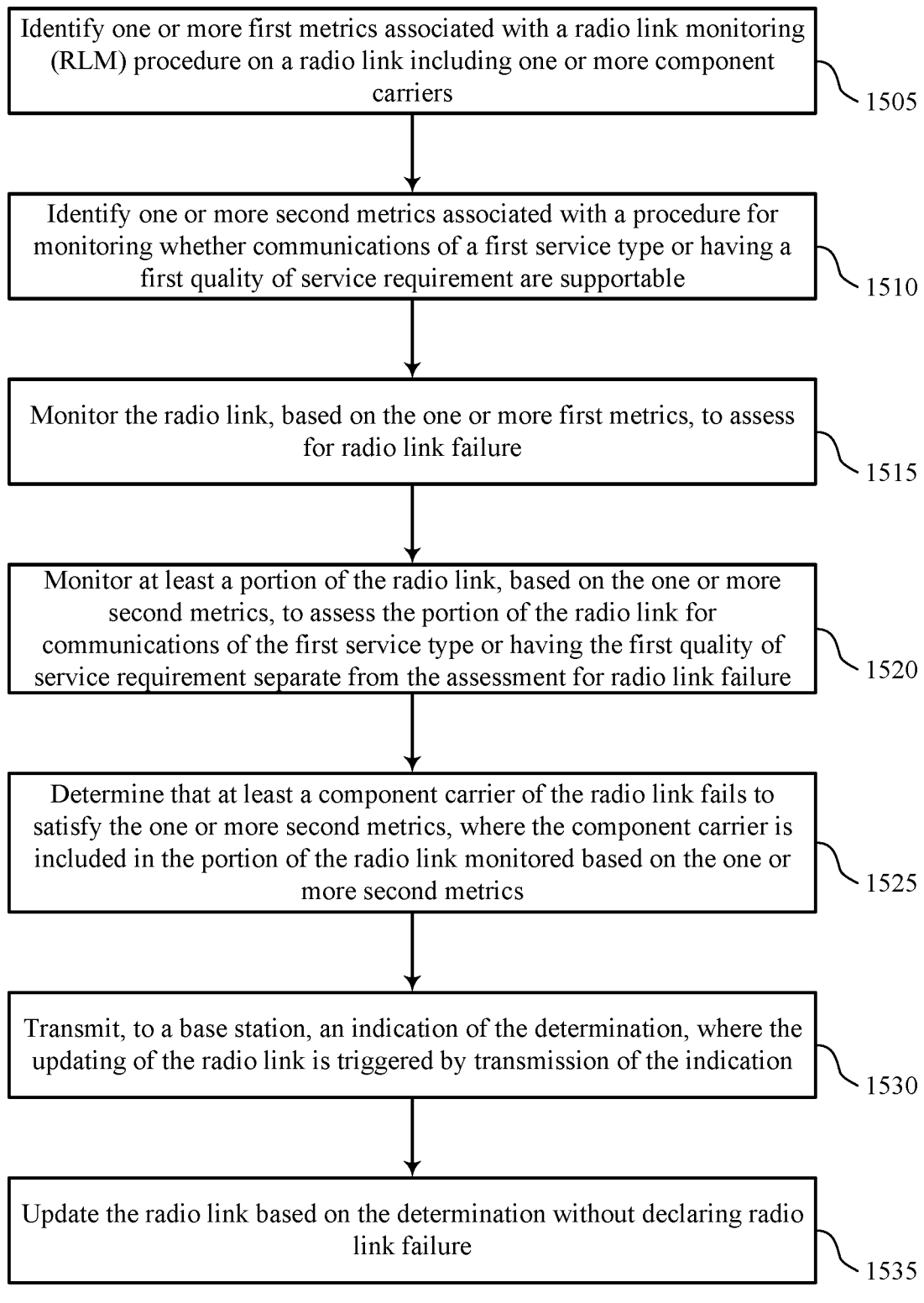

FIG. 15 shows a flowchart illustrating a method 1500 that supports link quality monitoring, signaling and procedures for specific service types in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify one or more first metrics associated with an RLM procedure on a radio link including one or more component carriers. The operations of 1505 may be performed according to the methods described herein. In some examples, aspects of the operations of 1505 may be performed by a first metrics component as described with reference to FIGS. 6 through 9.

At 1510, the UE may identify one or more second metrics associated with a procedure for monitoring whether communications of a first service type or having a first quality of service requirement are supportable. The operations of 1510 may be performed according to the methods described herein. In some examples, aspects of the operations of 1510 may be performed by a second metrics component as described with reference to FIGS. 6 through 9.

At 1515, the UE may monitor the radio link, based on the one or more first metrics, to assess for radio link failure. The operations of 1515 may be performed according to the methods described herein. In some examples, aspects of the operations of 1515 may be performed by a radio link failure component as described with reference to FIGS. 6 through 9.

At 1520, the UE may monitor at least a portion of the radio link, based on the one or more second metrics, to assess the portion of the radio link for communications of the first service type or having the first quality of service requirement separate from the assessment for radio link failure. The operations of 1520 may be performed according to the methods described herein. In some examples, aspects of the operations of 1520 may be performed by a radio link monitoring component as described with reference to FIGS. 6 through 9.

At 1525, the UE may determine that at least a component carrier of the radio link fails to satisfy the one or more second metrics, where the component carrier is included in the portion of the radio link monitored based on the one or more second metrics. The operations of 1525 may be performed according to the methods described herein. In some examples, aspects of the operations of 1525 may be performed by a radio link quality component as described with reference to FIGS. 6 through 9.

At 1530, the UE may transmit, to a base station, an indication of the determination, where the updating of the radio link is triggered by transmission of the indication. The operations of 1530 may be performed according to the methods described herein. In some examples, aspects of the operations of 1530 may be performed by an indication component as described with reference to FIGS. 6 through 9.

At 1535, the UE may update the radio link based on the determination without declaring radio link failure. The operations of 1535 may be performed according to the methods described herein. In some examples, aspects of the operations of 1535 may be performed by a radio link updating component as described with reference to FIGS. 6 through 9.

Figure 16:
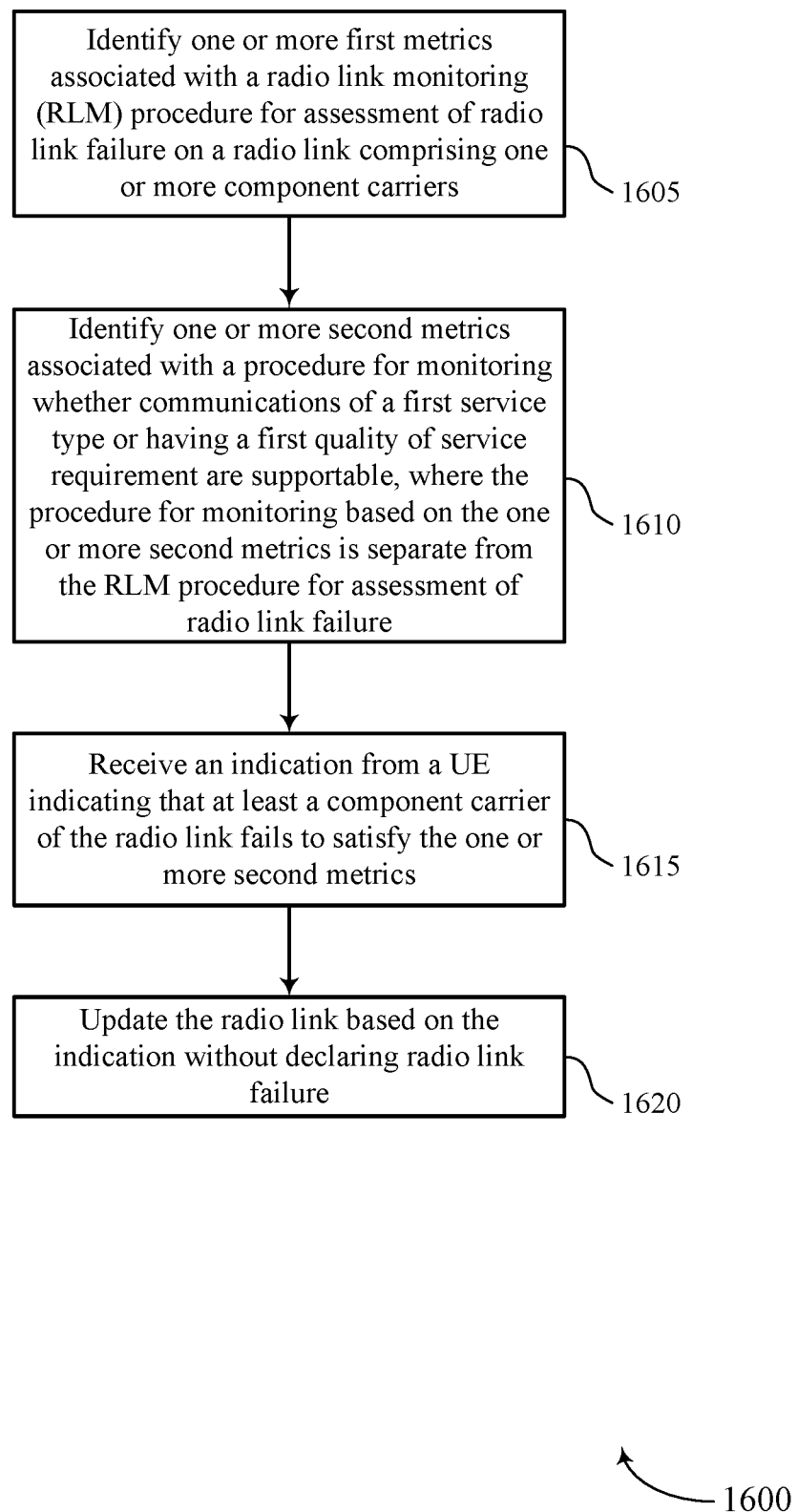

FIG. 16 shows a flowchart illustrating a method 1600 that supports link quality monitoring, signaling and procedures for specific service types in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify one or more first metrics associated with an RLM procedure for assessment of radio link failure on a radio link comprising one or more component carriers. The operations of 1605 may be performed according to the methods described herein. In some examples, aspects of the operations of 1605 may be performed by a first metrics identifying component as described with reference to FIGS. 10 through 13.

At 1610, the base station may identify one or more second metrics associated with a procedure for monitoring whether communications of a first service type or having a first quality of service requirement are supportable, where the procedure for monitoring based on the one or more second metrics is separate from the RLM procedure for assessment of radio link failure. The operations of 1610 may be performed according to the methods described herein. In some examples, aspects of the operations of 1610 may be performed by a second metrics identifying component as described with reference to FIGS. 10 through 13.

At 1615, the base station may receive an indication from a UE indicating that at least a component carrier of the radio link fails to satisfy the one or more second metrics. The operations of 1615 may be performed according to the methods described herein. In some examples, aspects of the operations of 1615 may be performed by an indication receiving component as described with reference to FIGS. 10 through 13.

At 1620, the base station may update the radio link based on the indication without declaring radio link failure. The operations of 1620 may be performed according to the methods described herein. In some examples, aspects of the operations of 1620 may be performed by a radio link updating component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying one or more first metrics associated with a radio link monitoring (RLM) procedure on a radio link comprising one or more component carriers;
    identifying one or more second metrics associated with a procedure for monitoring whether communications of a first service type or having a first quality of service requirement are supportable;
    monitoring the radio link, based at least in part on the one or more first metrics, to assess for radio link failure;
    monitoring at least a portion of the radio link, based at least in part on the one or more second metrics, to assess the portion of the radio link for communications of the first service type or having the first quality of service requirement separate from the assessment for radio link failure;
    determining that at least a component carrier of the radio link fails to satisfy the one or more second metrics, wherein the component carrier is included in the portion of the radio link monitored based at least on the one or more second metrics; and
    updating the radio link based at least in part on the determination without declaring radio link failure.

2. The method of claim 1, further comprising:
    transmitting, to a base station, an indication of the determination, wherein the updating of the radio link is triggered by transmission of the indication.

3. The method of claim 2, wherein transmitting the indication comprises:
    transmitting the indication on a per component carrier basis.

4. The method of claim 2, wherein transmitting the indication comprises:
    transmitting the indication for all component carriers on the radio link collectively.

5. The method of claim 2, wherein transmitting the indication comprises:
    transmitting the indication on a per quality of service requirement basis, wherein each communication has a corresponding quality of service requirement.

6. The method of claim 2, wherein transmitting the indication comprises:
    transmitting the indication on a per service type basis.

7. The method of claim 2, wherein transmitting the indication comprises:
    transmitting the indication on either a legacy channel or on a channel corresponding to either the first service type or the first quality of service requirement.

8. The method of claim 2, wherein transmitting the indication comprises:
    transmitting the indication over a scheduling request resource.

9. The method of claim 2, wherein transmitting the indication comprises:
    transmitting the indication using either a medium access control (MAC) control element or L1 based element.

10. The method of claim 2, wherein transmitting the indication comprises:
    transmitting the indication over channels either within a secondary cell group or a master cell group during dual connectivity.

11. The method of claim 2, wherein transmitting the indication comprises:
    transmitting the indication over a Long Term Evolution (LTE) band when the indication pertains to a non-LTE band.

12. The method of claim 1, wherein monitoring the portion of the radio link comprises:
    measuring a signal-to-noise ratio via a reference signal received power (RSRP) on the portion of the radio link.

13. The method of claim 1, wherein monitoring the portion of the radio link comprises:
    decoding a virtual physical downlink control channel (PDCCH) of a known size or aggregation level provided by radio resource control signaling.

14. The method of claim 1, wherein monitoring the portion of the radio link comprises:
    measuring the one or more second metrics on a per component carrier basis.

15. The method of claim 1, wherein monitoring the portion of the radio link comprises:
    monitoring the one or more second metrics on a per cell basis.

16. The method of claim 1, wherein monitoring the portion of the radio link comprises:
    measuring the one or more second metrics on a per quality of service basis in order to reflect different target block error rates (BLERs).

17. The method of claim 1, wherein monitoring the portion of the radio link comprises:
    measuring the one or more second metrics on a per traffic basis.

18. The method of claim 1, wherein monitoring the portion of the radio link comprises:
    monitoring the one or more second metrics on a per traffic type basis.

19. The method of claim 1, wherein updating the radio link comprises:
    triggering a radio resource control (RRC) reconfiguration for one or more cells for at least one of the first service type or first quality of service requirement.

20. The method of claim 19, wherein triggering the RRC reconfiguration comprises:
triggering at least one of cell reselection, changing of transmission modes, reconfiguring of resource block sets, changing of aggregation levels, or reconfiguring of demodulation reference signals.

21. The method of claim 1, wherein updating the radio link comprises:
triggering a handover procedure wherein a legacy link is preserved.

22. The method of claim 1, wherein identifying the one or more second metrics comprises:
receiving a configuration that includes the one or more second metrics.

23. The method of claim 22, wherein the configuration is specific to at least one of a component carrier, the first service type or the first quality of service requirement.

24. The method of claim 22, wherein the configuration is based at least in part on a transmission time interval length for the portion of the radio link.

25. The method of claim 22, wherein the configuration includes in synchronization and out of synchronization thresholds that are different from those used for the RLM procedure.

26. The method of claim 22, wherein the configuration includes out of synchronization parameter, in synchronization parameter, or out of synchronization timer values that are different from those used for the RLM procedure.

27. The method of claim 1, wherein updating the radio link comprises:
triggering a reconfiguration or reactivation of a semi-persistent scheduling operation.

28. An apparatus for wireless communication, comprising:
a processor,
memory coupled with the processor; and
instructions stored in the memory and executable by the processor to cause the apparatus to:
identify one or more first metrics associated with a radio link monitoring (RLM) procedure on a radio link comprising one or more component carriers;
identify one or more second metrics associated with a procedure for monitoring whether communications of a first service type or having a first quality of service requirement are supportable;
monitor the radio link, based at least in part on the one or more first metrics, to assess for radio link failure;
monitor at least a portion of the radio link, based at least in part on the one or more second metrics, to assess the portion of the radio link for communications of the first service type or having the first quality of service requirement separate from the assessment for radio link failure;
determine that at least a component carrier of the radio link fails to satisfy the one or more second metrics, wherein the component carrier is included in the portion of the radio link monitored based at least on the one or more second metrics; and
update the radio link based at least in part on the determination without declaring radio link failure.

29. An apparatus for wireless communication, comprising:
means for identifying one or more first metrics associated with a radio link monitoring (RLM) procedure on a radio link comprising one or more component carriers;
means for identifying one or more second metrics associated with a procedure for monitoring whether communications of a first service type or having a first quality of service requirement are supportable;
means for monitoring the radio link, based at least in part on the one or more first metrics, to assess for radio link failure;
means for monitoring at least a portion of the radio link, based at least in part on the one or more second metrics, to assess the portion of the radio link for communications of the first service type or having the first quality of service requirement separate from the assessment for radio link failure;
means for determining that at least a component carrier of the radio link fails to satisfy the one or more second metrics, wherein the component carrier is included in the portion of the radio link monitored based at least on the one or more second metrics; and
means for updating the radio link based at least in part on the determination without declaring radio link failure.

30. A non-transitory computer-readable medium storing code for wireless communication, the code comprising instructions executable by a processor to:
identify one or more first metrics associated with a radio link monitoring (RLM) procedure on a radio link comprising one or more component carriers;
identify one or more second metrics associated with a procedure for monitoring whether communications of a first service type or having a first quality of service requirement are supportable;
monitor the radio link, based at least in part on the one or more first metrics, to assess for radio link failure;
monitor at least a portion of the radio link, based at least in part on the one or more second metrics, to assess the portion of the radio link for communications of the first service type or having the first quality of service requirement separate from the assessment for radio link failure;
determine that at least a component carrier of the radio link fails to satisfy the one or more second metrics, wherein the component carrier is included in the portion of the radio link monitored based at least on the one or more second metrics; and
update the radio link based at least in part on the determination without declaring radio link failure.

* * * * *